United States Patent
Kent et al.

(10) Patent No.: US 11,093,079 B2
(45) Date of Patent: *Aug. 17, 2021

(54) TOUCHSCREEN EDGE CORRECTION

(71) Applicant: Elo Touch Solutions, Inc., Milpitas, CA (US)

(72) Inventors: Joel Kent, Fremont, CA (US); Gazi Ali, Sunnyvale, CA (US); Khalid Azim, Fremont, CA (US)

(73) Assignee: Elo Touch Solutions, Inc., Milpitas, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/942,107

(22) Filed: Jul. 29, 2020

(65) Prior Publication Data

US 2020/0356198 A1    Nov. 12, 2020

Related U.S. Application Data

(63) Continuation of application No. 15/580,995, filed as application No. PCT/US2017/042837 on Jul. 19, (Continued)

(51) Int. Cl.
*G06F 3/041*   (2006.01)
*G06F 3/044*   (2006.01)

(52) U.S. Cl.
CPC .......... *G06F 3/04166* (2019.05); *G06F 3/044* (2013.01); *G06F 3/0416* (2013.01); *G06F 3/0445* (2019.05); *G06F 3/0446* (2019.05); *G06F 3/0448* (2019.05); *G06F 3/04164* (2019.05); *G06F 2203/04103* (2013.01); *G06F 2203/04107* (2013.01)

(58) Field of Classification Search
CPC ......... G06F 3/0446; G06F 2203/04103; G06F 2203/04107
See application file for complete search history.

(56) References Cited

U.S. PATENT DOCUMENTS 8,400,418 B2   3/2013   Matsuo
8,558,805 B2   10/2013  Lee
(Continued)

OTHER PUBLICATIONS

Gurries, M., "Simple Battery Circuit Extends Power over Ethernet Peak Current," Linear Technology Design Notes, Dec. 2015; 2 pages.

(Continued)

*Primary Examiner* — Ryan A Lubit
(74) *Attorney, Agent, or Firm* — Sterne, Kessler, Goldstein & Fox P.L.L.C,

(57) ABSTRACT

Various configurations and arrangements for touchscreens are disclosed to accommodate for one or more optical discontinuities that can be present within these touchscreens. When the one or more optical discontinuities are present, these configurations and arrangements of the touchscreens present a single layer of transparent conductive material that can be difficult to perceive by a human eye when viewing the touchscreens. Additionally, various edge correction techniques are disclosed to adjust mutual capacitances along a perimeter of the touchscreens. These edge correction techniques adjust mutual capacitances such that the values of the mutual capacitances are substantially uniform throughout.

20 Claims, 25 Drawing Sheets

Related U.S. Application Data 2017, now Pat. No. 10,732,772, which is a continuation of application No. 15/214,196, filed on Jul. 19, 2016.

(56) References Cited

U.S. PATENT DOCUMENTS

| | | | |
|---|---|---|---|
| 9,104,254 B2 | 8/2015 | Kim | |
| 9,684,423 B2 | 6/2017 | Kuriki | |
| 2004/0239650 A1 | 12/2004 | Mackey | |
| 2006/0097991 A1 | 5/2006 | Hotelling et al. | |
| 2007/0229470 A1* | 10/2007 | Snyder | G06F 3/011 |
| | | | 345/173 |
| 2008/0179112 A1 | 1/2008 | Qin et al. | |
| 2009/0135157 A1 | 5/2009 | Harley | |
| 2009/0213090 A1 | 8/2009 | Mamba | |
| 2010/0045625 A1 | 2/2010 | Yang | |
| 2011/0048812 A1 | 3/2011 | Yilmaz | |
| 2011/0096025 A1 | 4/2011 | Slobodin et al. | |
| 2012/0044193 A1 | 2/2012 | Peng et al. | |
| 2012/0242606 A1 | 9/2012 | Mackey | |
| 2014/0022202 A1* | 1/2014 | Badaye | G06F 3/0448 |
| | | | 345/174 |
| 2014/0210784 A1* | 7/2014 | Gourevitch | H03K 17/962 |
| | | | 345/174 |
| 2014/0211109 A1* | 7/2014 | Wu | G06F 3/0448 |
| | | | 349/12 |
| 2015/0029116 A1 | 1/2015 | Kim | |
| 2015/0054782 A1 | 2/2015 | Liu | |
| 2015/0068884 A1 | 3/2015 | Kuriki | |
| 2015/0109249 A1* | 4/2015 | Tian | G06F 3/0445 |
| | | | 345/174 |
| 2015/0286316 A1* | 10/2015 | Peterson | G06F 3/04186 |
| | | | 345/174 |
| 2016/0011690 A1 | 1/2016 | Rowe et al. | |
| 2016/0209441 A1* | 7/2016 | Mazzeo | G06F 3/0444 |
| 2017/0160830 A1 | 6/2017 | Lee | |
| 2017/0168572 A1 | 6/2017 | Peshkin | |
| 2017/0177113 A1* | 6/2017 | Shen | G06F 3/0446 |
| 2018/0024665 A1 | 1/2018 | Kent et al. | |
| 2018/0024690 A1 | 1/2018 | Ali et al. | |
| 2018/0088704 A1 | 3/2018 | Schlegelmilch | |
| 2020/0050323 A1 | 2/2020 | Kent et al. | |
| 2020/0142464 A1 | 5/2020 | Ekanayake et al. | |

OTHER PUBLICATIONS

International Search Report and Written Opinion of the International Searching Authority directed to related International Patent Application No. PCT/US17/42837, dated Oct. 19, 2017; 7 pages.
International Preliminary Report on Patentability directed to related International Patent Application No. PCT/US17/42837, dated Jan. 22, 2019; 6 pages.

* cited by examiner

TOUCHSCREEN EDGE CORRECTION

CROSS-REFERENCE TO RELATED APPLICATIONS

This application is a continuation application to U.S. Nonprovisional patent application Ser. No. 15/580,995, with 371(c) Date: Dec. 8, 2017, entitled Projected-Capacitive (PCAP) Touchscreen, which is a National Stage entry from PCT/US2017/042837 filed on Jul. 19, 2017, entitled Projected-Capacitive (PCAP) Touchscreen, which claims priority as a continuation application to U.S. application Ser. No. 15/214,196 filed on Jul. 19, 2016, entitled Projected-Capacitive (PCAP) Touchscreen, all of which are incorporated herein by reference in their entireties.

BACKGROUND OF THE DISCLOSURE

A commercial electronic device interacts with an operator using a touchscreen. A touchscreen system, including a display and the touchscreen, provides one or more images and/or video to the operator and receives one or more commands and/or data from the operator. The touchscreen system detects a presence and/or a location of a touch from an operator, such as a finger of the operator, a hand of the operator, and/or other passive objects available to the operator, such as a stylus to provide an example, within the touchscreen. The commercial electronic devices interpret the presence and/or the location of the touch as one or more commands and/or data from the operator.

BRIEF DESCRIPTION OF THE DRAWINGS/FIGURES

Aspects of the present disclosure are best understood from the following Detailed Description when read with the accompanying Drawings/Figures. It is noted that, in accordance with the standard practice in the industry, various features are not drawn to scale. In fact, the dimensions of the various features may be arbitrarily increased or reduced for clarity of discussion. In the drawings.

Figure 8A:
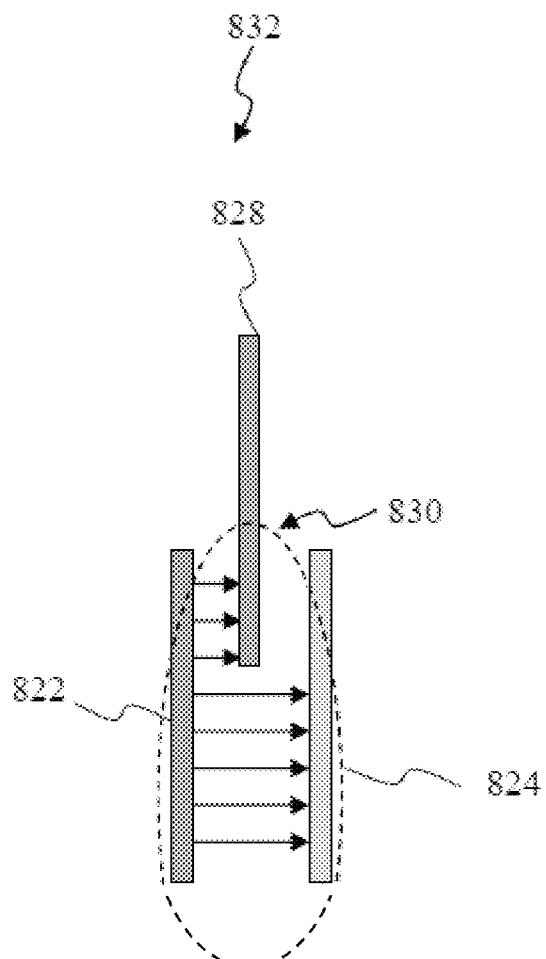
Figure 8B:
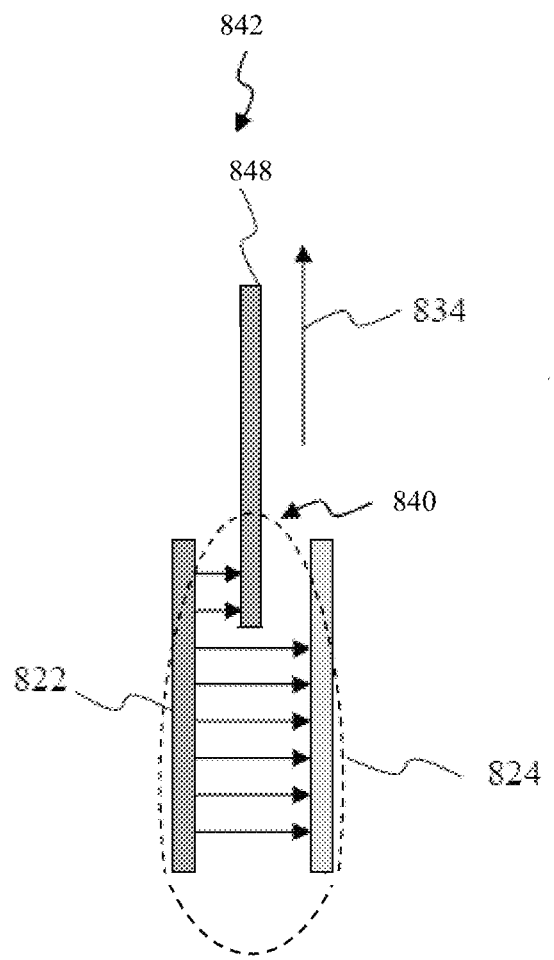
Figure 8C:
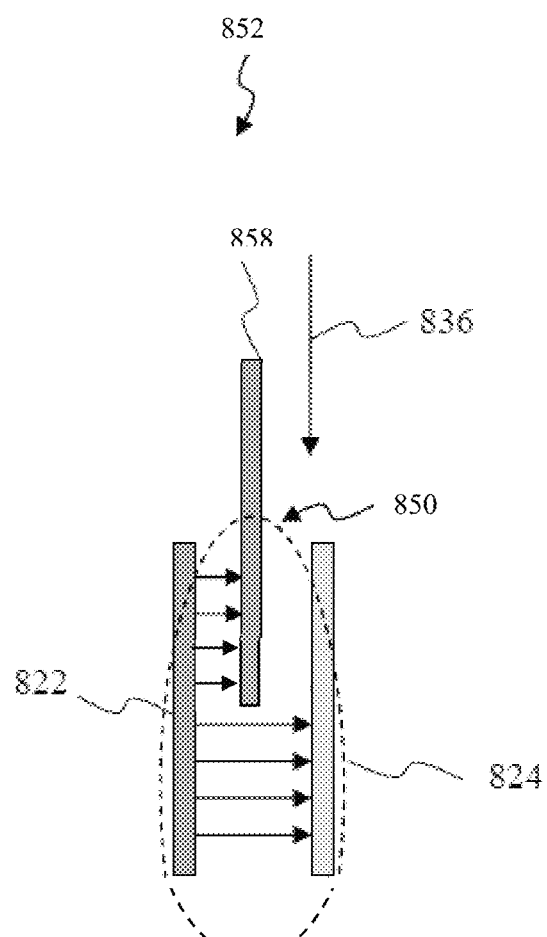
Figure 9:
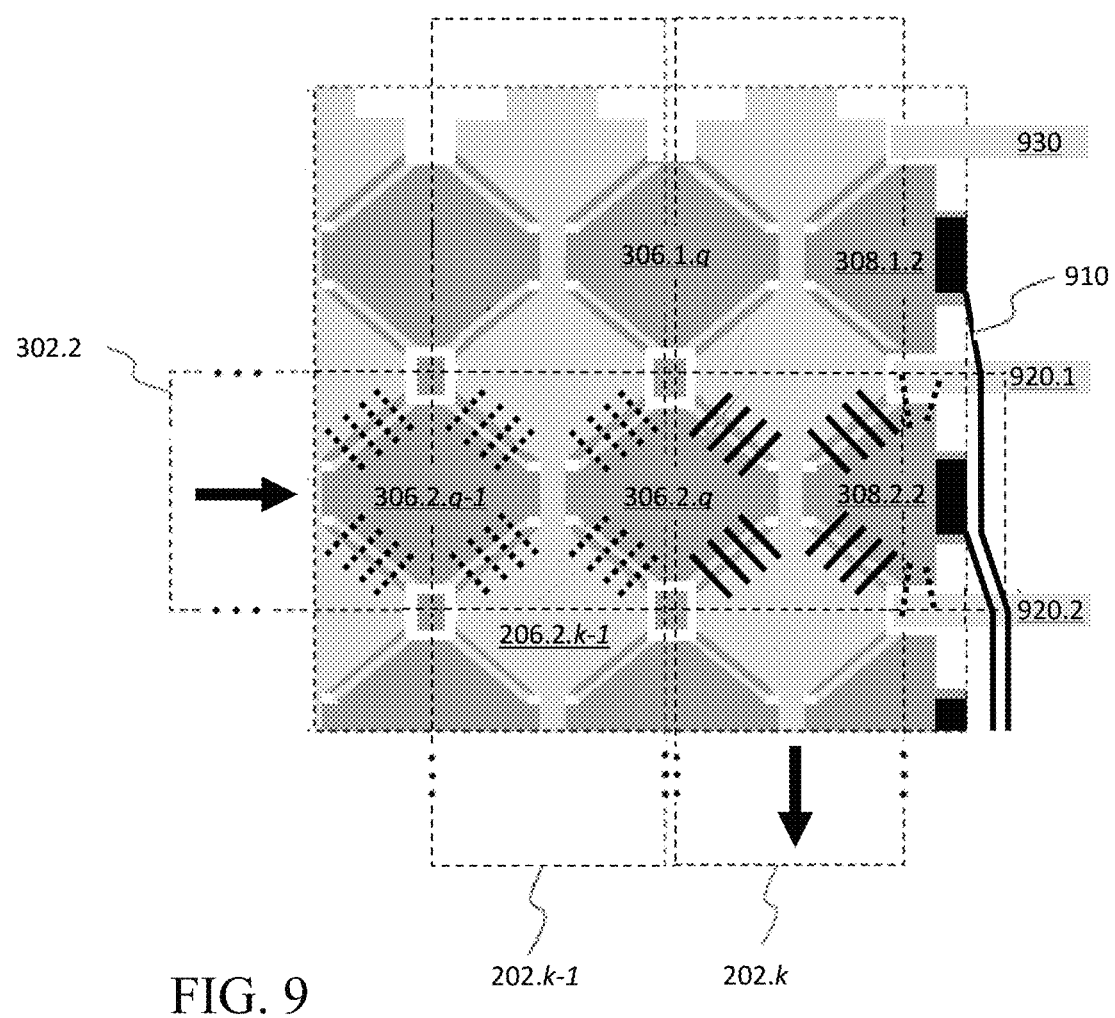
Figure 10:
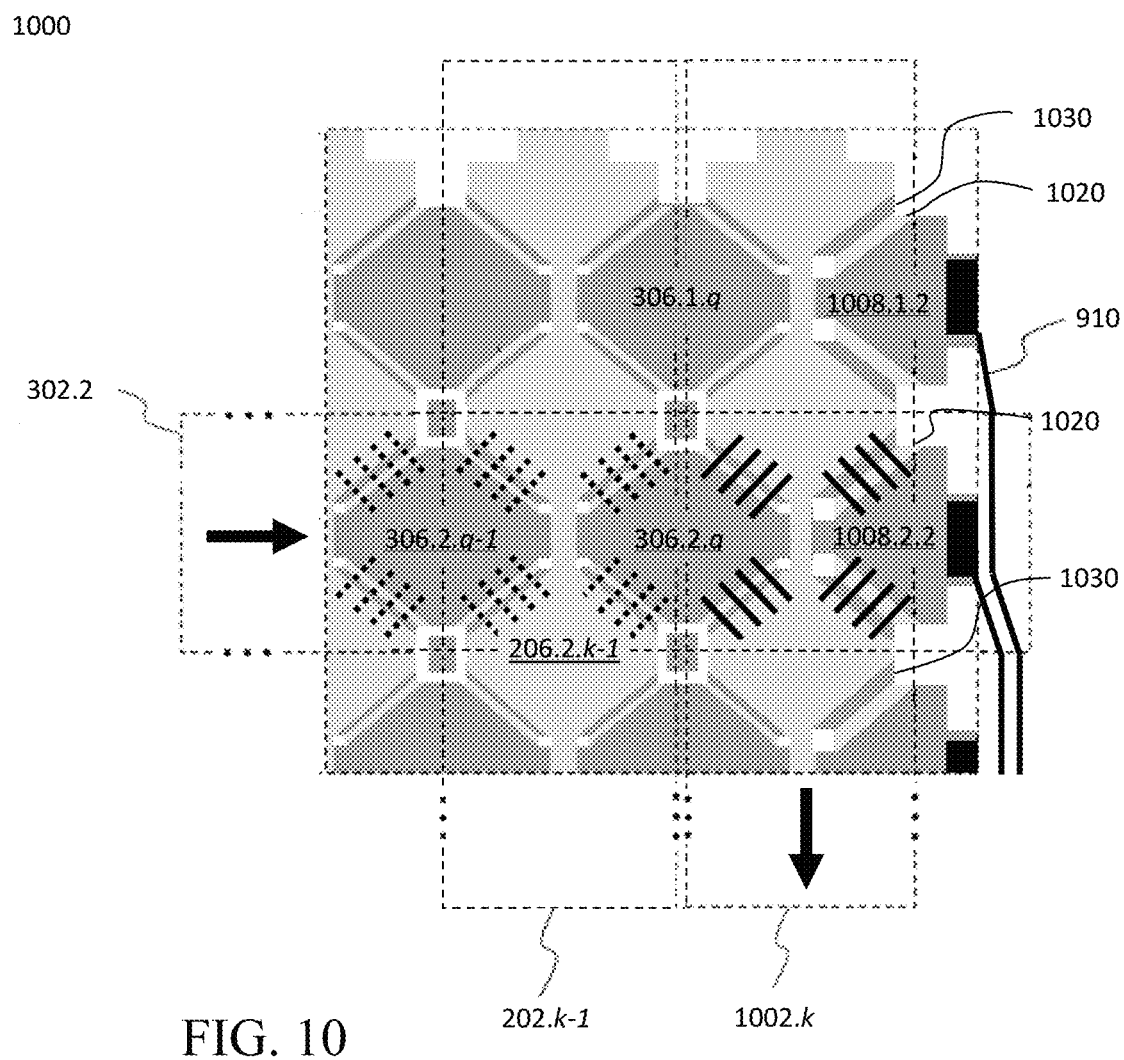
Figure 11:
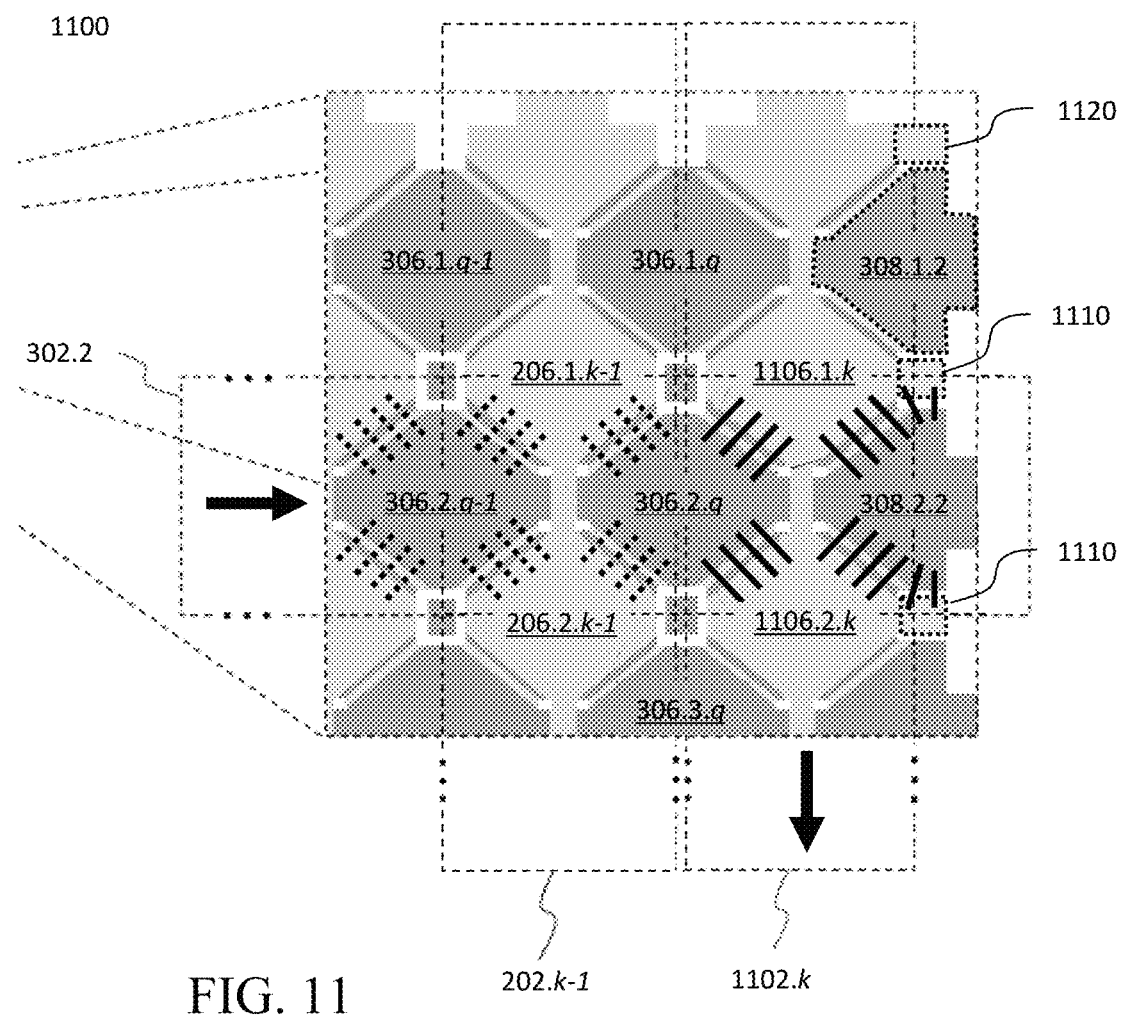
Figure 12:
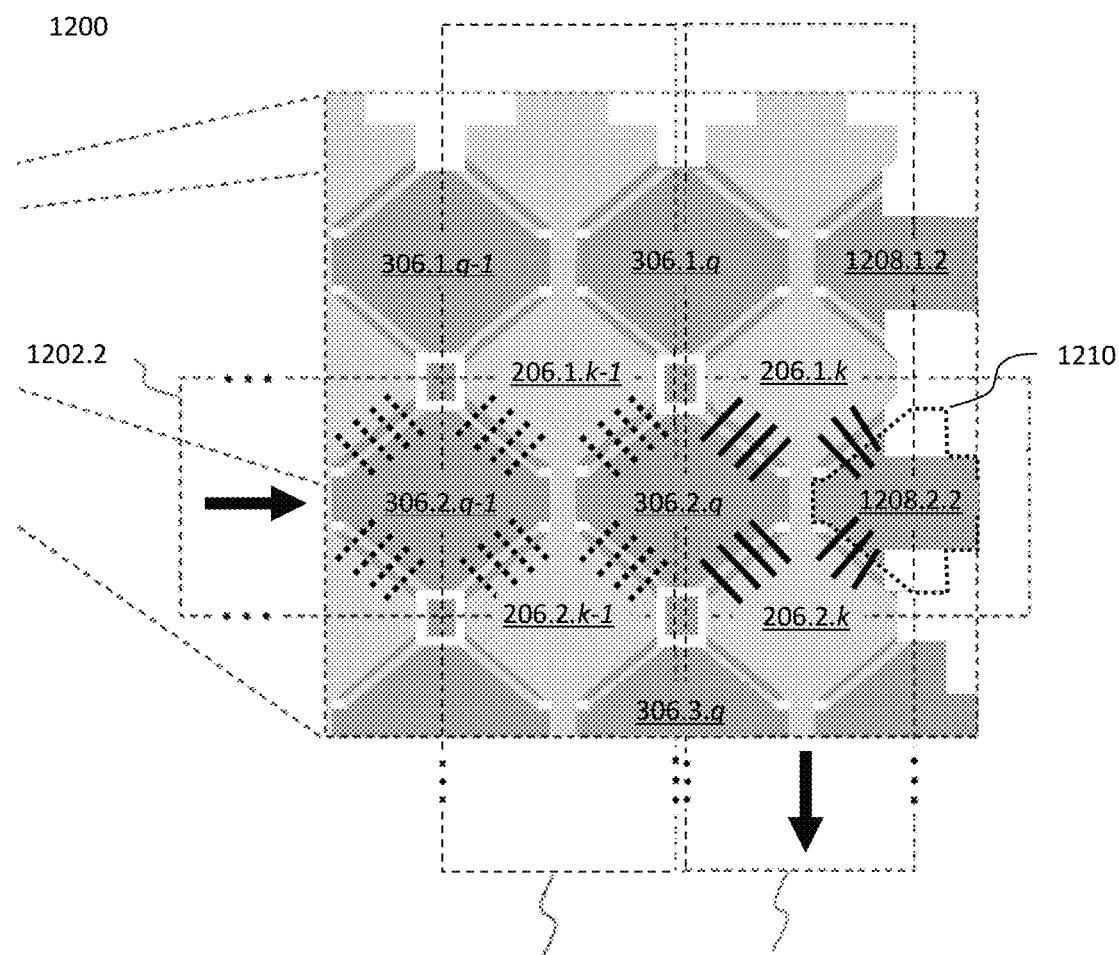
Figure 13A:
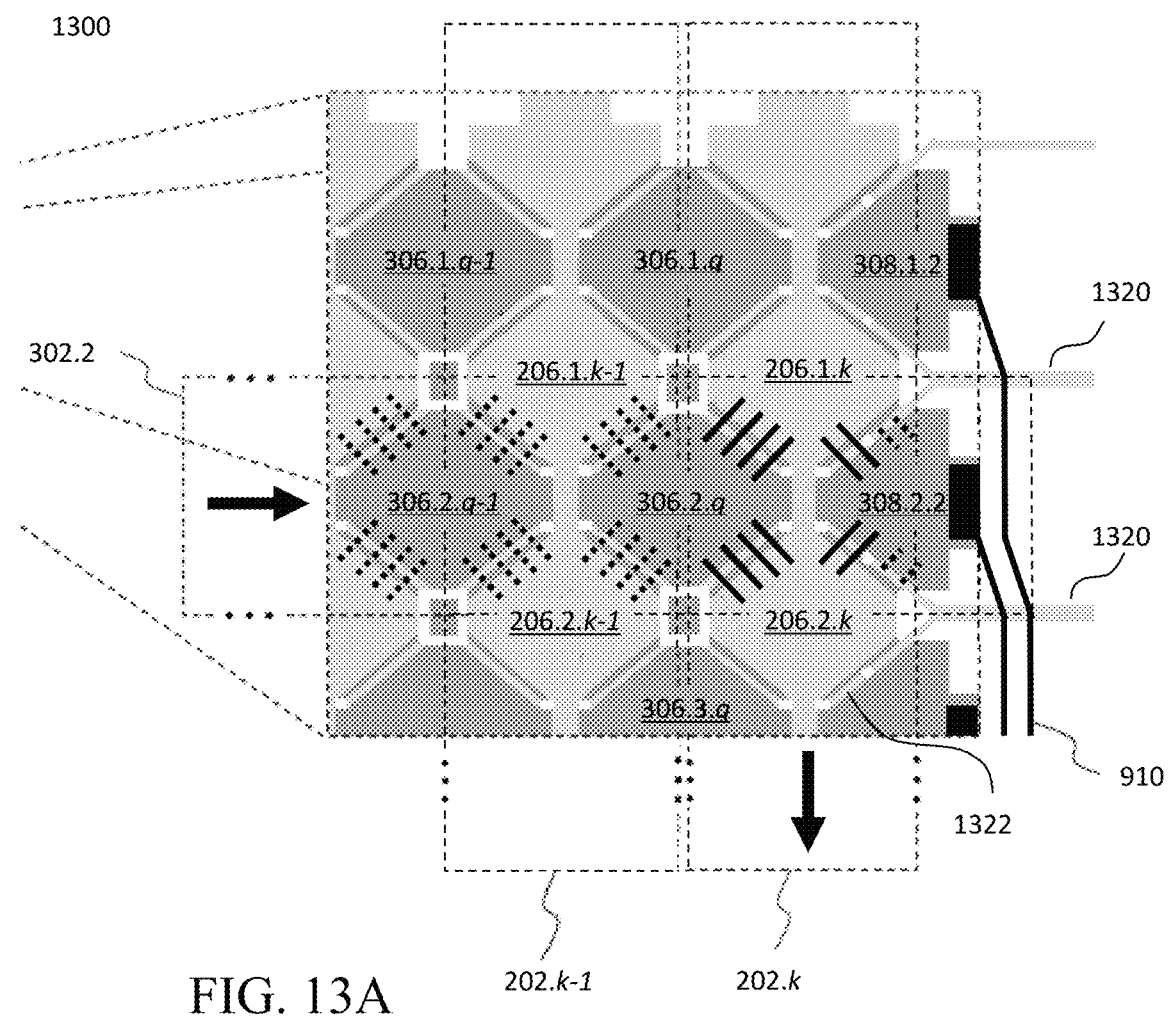
Figure 13B:
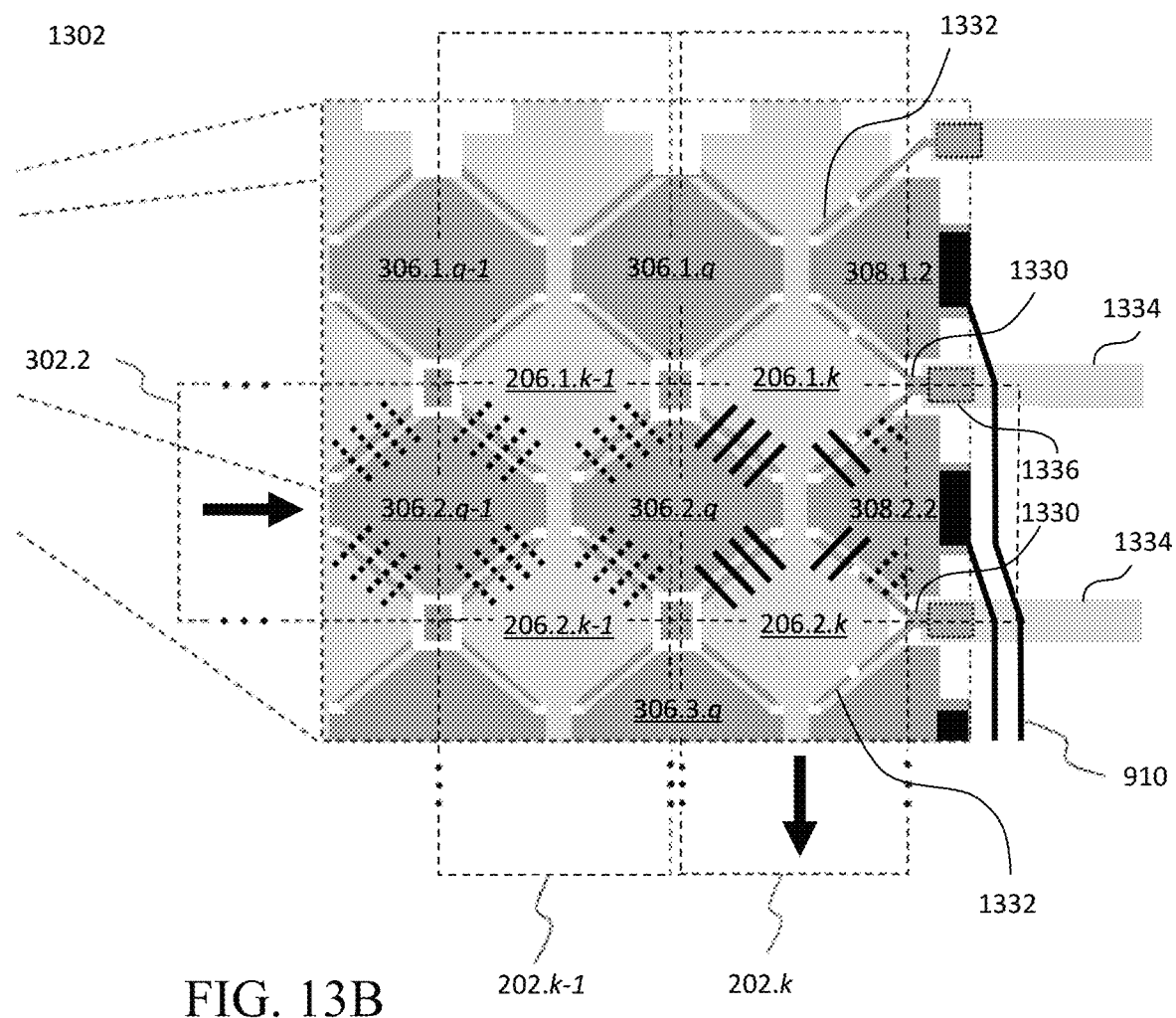
Figure 14:
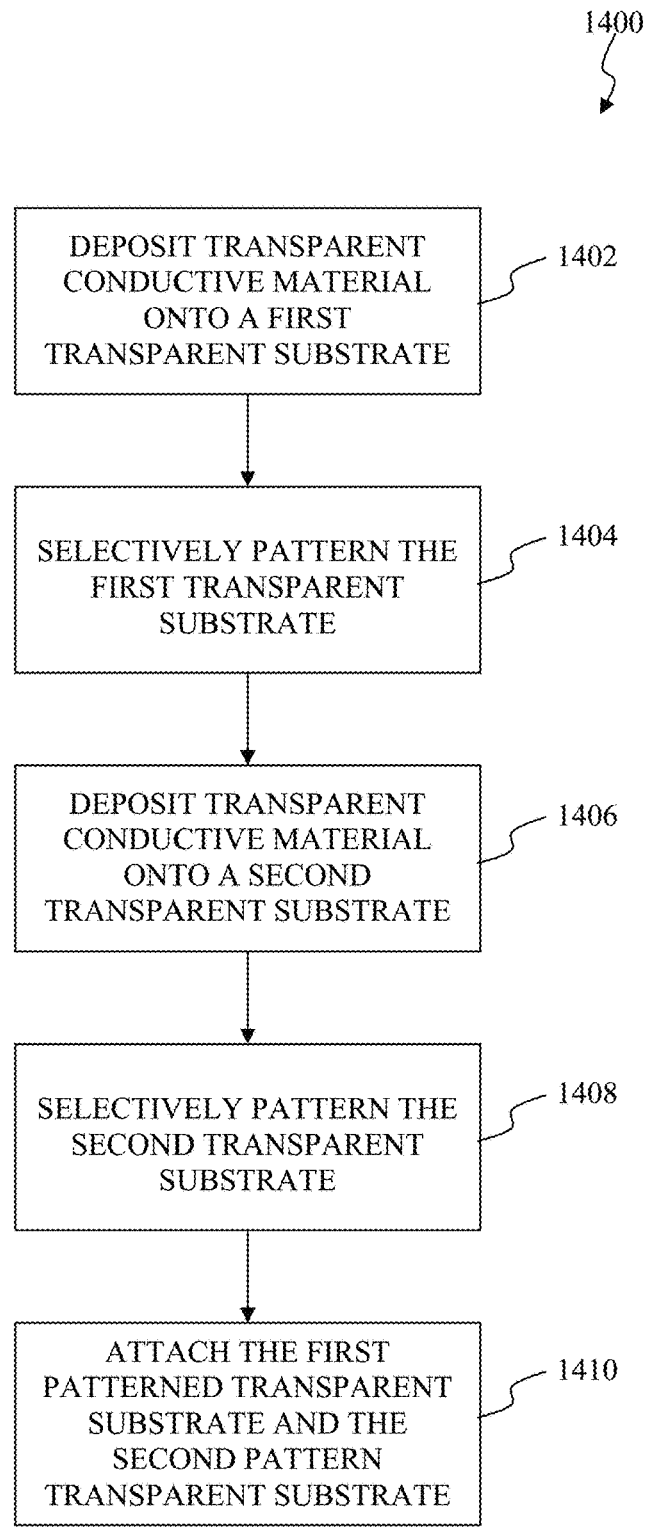
Figure 15:
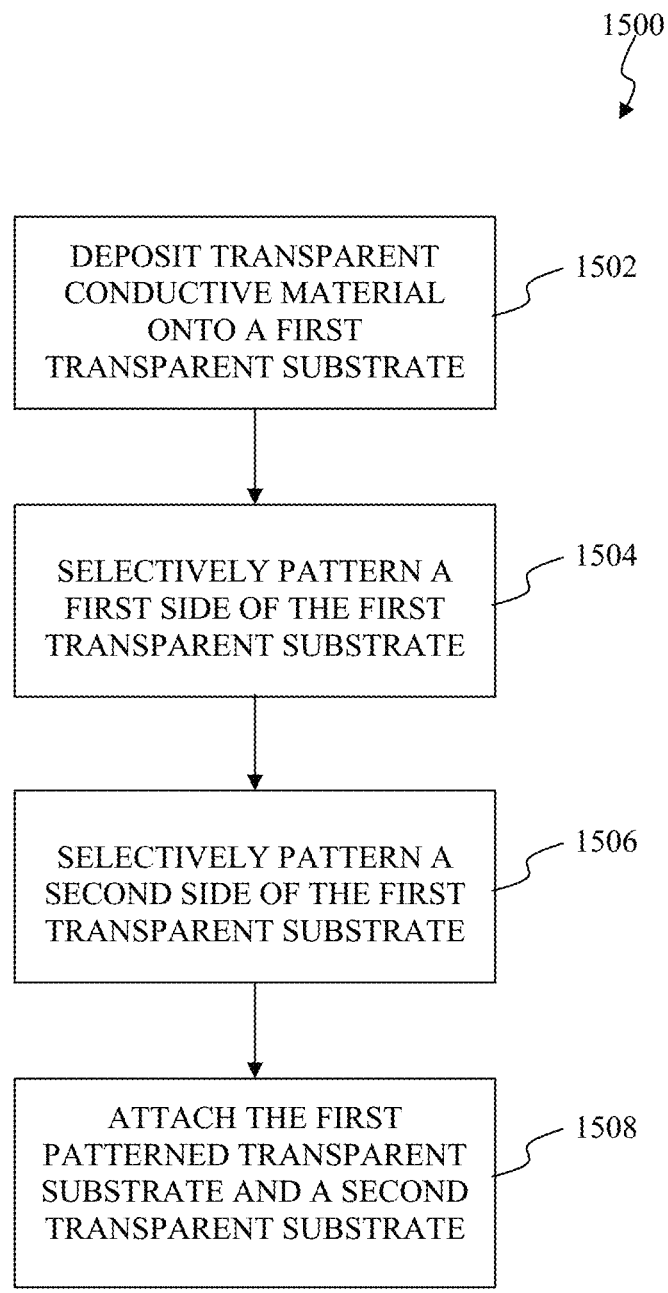

FIG. 8A through 8C conceptually illustrate example three-conductor systems;

FIG. 9 illustrates in part a fourth exemplary touchscreen according to an exemplary embodiment of the present disclosure;

FIG. 10 illustrates in part a fifth exemplary touchscreen and its operation according to an exemplary embodiment of the present disclosure;

FIG. 11 illustrates a sixth exemplary touchscreen and its operation according to an exemplary embodiment of the present disclosure;

FIG. 12 illustrates a seventh exemplary touchscreen and its operation according to an exemplary embodiment of the present disclosure;

FIG. 13A through 13B illustrate an eighth exemplary touchscreen according to an exemplary embodiment of the present disclosure;

FIG. 14 is a flowchart of a first exemplary fabrication control flow that can be used to fabricate the touchscreens according to an exemplary embodiment of the present disclosure; and FIG. 15 is a flowchart of a second exemplary fabrication control flow that can be used to fabricate the touchscreens according to an exemplary embodiment of the present disclosure.

The present disclosure will now be described with reference to the accompanying drawings. In the drawings, like reference numbers generally indicate identical, functionally similar, and/or structurally similar elements. The drawing in which an element first appears is indicated by the leftmost digit(s) in the reference number.

DETAILED DESCRIPTION OF THE DISCLOSURE

Overview

Various configurations and arrangements for touchscreens are disclosed to accommodate for one or more optical discontinuities that can be present within these touchscreens. When the one or more optical discontinuities are present, these configurations and arrangements of the touchscreens approximately present a single layer of transparent conductive material that can be difficult to perceive by a human eye, as desired, when viewing the touchscreens. In some situations, these configurations and arrangements of the touchscreens present some areas of multiple layers of transparent conductive material and/or some areas of no transparent conductive material. However, the configurations and arrangements of the touchscreens sufficiently minimize these areas of multiple layers of transparent conductive material and/or these areas of no transparent conductive material to be difficult to perceive by the human eye when viewing the touchscreen. Additionally, various edge correction techniques are disclosed to adjust mutual capacitances along a perimeter of the touchscreens. These edge correction techniques adjust mutual capacitances such that local electrostatic fields generated by the touchscreens result in values of mutual capacitance that are substantially uniform throughout.

Figure 1:
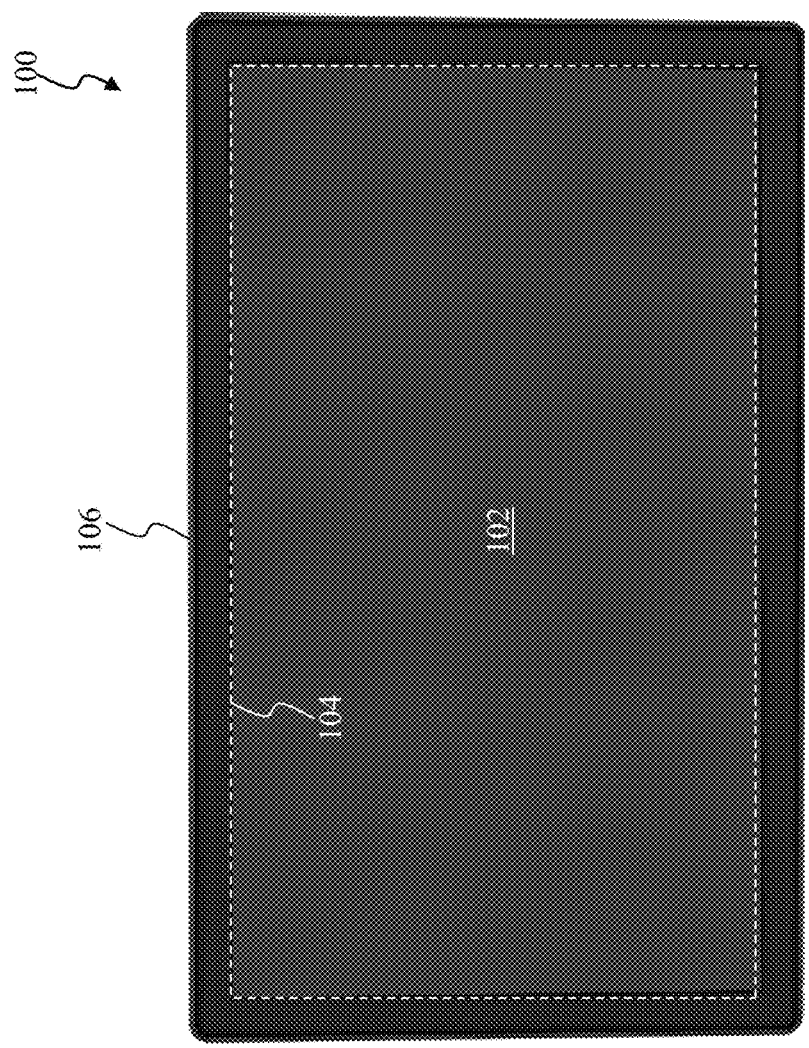
FIG. 1 illustrates a touch-interactive device according to an exemplary embodiment of the present disclosure.

A Touch-Interactive Device According to an Exemplary Embodiment of the Present Disclosure FIG. 1 illustrates a touch-interactive device according to an exemplary embodiment of the present disclosure. As illustrated in FIG. 1, a touch-interactive device 100 represents a commercial electronic device with a large range of sizes and/or applications for communicating information with an operator. For example, the touch-interactive device 100 can represent a large commercial wall mounted device, having a thirty-two inch diagonal dimension to provide an example, which can be located in a large commercial retail store. Typically, commercial electronic devices, when compared to consumer electronic devices, have larger sizes and/or stationary locations. Additionally, commercial electronic devices have a tendency to be manufactured in lower quantities, such as tens of thousands of units, whereas consumer electronic devices have a tendency to be manufactured in higher quantities, such as millions of units. As such, commercial electronic devices typically are manufactured using a different process, such as a screen printing process as opposed to a lithography process of the consumer electronic devices, to lessen the overhead associated with manufacturing the lower quantities. In an exemplary embodiment, the touch-interactive device 100 can represent a point of sale system, a kiosk system in retail and tourist settings, a video gaming device, an automatic teller machine (ATM), or any other commercial electronic device having a touchscreen. Although the preferred embodiment described herein represents a commercial electronic device manufactured in lower quantities, those skilled in the relevant art(s) will recognize that the teachings herein may also be applicable to a consumer electronic device manufactured in higher quantities, e.g., an all-in-one computer, a tablet computer, a smartphone, a personal digital assistant (PDA), a satellite navigation device, a video gaming device, an interne connected appliance, or any other consumer electronic device.

Generally, the touch-interactive device 100 includes a touchscreen 102 placed over a graphical display 104 and associated mechanical housing and/or electronics 106. Although not illustrated in FIG. 1, the touch-interactive device 100 can be communicatively coupled to and/or can include one or more peripheral devices such as a computer with networking capabilities, a speaker, a mouse, a graphic tablet, a barcode reader, a scanner, a microphone, a webcam, a game controller, a stylus, a digital camera, or any other suitable device that is capable of connecting to and/or interfacing with the touch-interactive device 100. As illustrated in FIG. 1, the touchscreen 102 is typically situated in front of the graphical display 104. The graphical display 104 operates as an output device to provide one or more images and/or video relating to one or more applications being executed by the touch-interactive device 100. In some situations, the operator of the touch-interactive device 100 can touch various areas of the touchscreen 102 that correspond to various areas of the graphical display 104. Herein, a touch refers to physical contact between the touchscreen 102 and the operator or the operator being sufficiently proximate to, with no physical contact with, the touchscreen 102 to disrupt local electrostatic fields within the touchscreen 102. The touchscreen 102 detects a presence and/or a location of the touch and can interpret the presence and/or the location of the touch as one or more commands and/or data from the operator.

The touchscreen 102 includes a first set of electrodes and a second set of electrodes. In an exemplary embodiment, the first set of electrodes is oriented in a vertical direction, such as perpendicular to an x-axis of a Cartesian coordinate system, and the second set of electrodes is oriented in a horizontal direction, such as perpendicular to the y-axis of the Cartesian coordinate system. The first set of electrodes and the second set of electrodes, as presented with reference to FIG. 1, and those referenced hereinbelow in alternate embodiments, can be formed using indium-tin-oxide (ITO). However, those skilled in the relevant art(s) will recognize the first set of electrodes and/or the second set of electrodes can be formed using any suitable transparent conductive material without departing from the spirit and scope of the present disclosure. These suitable transparent conductive materials can include one or more transparent conductive oxides (TCOs), one or more conductive polymers, metal grids, one or more carbon nanotubes (CNT), graphene, one or more nanowire meshes, and one or more ultra-thin metal films to provide some examples.

The first set of electrodes and the second set of electrodes can be formed using a single-sided ITO (SITO) design or a double-sided ITO (DITO) design. In the SITO design, a first transparent substrate includes a first ITO coating, which is selectively patterned to form the first set of electrodes, and a second transparent substrate includes a second ITO coating, which is selectively patterned to form the second set of electrodes. The first transparent substrate and the second transparent substrate having the first set of electrodes and the second set of electrodes, respectively, are attached to each other with an optically clear adhesive (OCA) to form the touchscreen 102 in the SITO design. However, in the DITO design, a first transparent substrate includes a first ITO coating on a first surface and a second ITO coating on a second surface, which are selectively patterned to form the first set of electrodes and the second set of electrodes, respectively. The first transparent substrate, having the first set of electrodes and the second set of electrodes, is attached to a second transparent substrate with the OCA to form the touchscreen 102 in the DITO design.

Ideally, the first set of electrodes is sufficiently proximate to the second set of electrodes such that no optical discontinuities are present when viewing the touchscreen 102. However, in some situations, the first set of electrodes is sufficiently separated from the second set of electrodes to cause one or more optical discontinuities within the touchscreen 102 when viewing the touchscreen 102. The one or more optical discontinuities typically result from variances in contrast of the touchscreen 102 resulting from placement of the first set of electrodes and the second set of electrodes.

For example, when the first set of electrodes and the second set of electrodes are sufficiently close to each other, any separation between the first set of electrodes and the second set of electrodes in the touchscreen 102 can be difficult to perceive by a human eye when viewing the touchscreen 102. In this example, the resolution of the human eye is insufficient to visualize this separation. However, in another example, when the first set of electrodes and the second set of electrodes are not sufficiently close to each other, any separation between the first set of electrodes and the second set of electrodes in the touchscreen 102 can be perceived by a human eye when viewing the touchscreen 102, since the resolution of the human eye can be sufficient to visualize this separation.

In an exemplary embodiment, the touchscreen 102 can include one or more floating transparent conductive islands between the first set of electrodes and the second set of electrodes to improve optical performance of the touchscreen 102. The one or more floating transparent conductive islands represent sections of conductive material that are not electrically connected within the touchscreen 102, namely the one or more floating transparent conductive islands are electrically floating. The one or more floating transparent conductive islands sufficiently fill the gap of separation between the first set of electrodes and the second set of electrodes to make optical discontinuities difficult to perceive by a human eye when viewing the touchscreen 102.

As discussed above, the first transparent substrate and the second transparent substrate are selectively patterned to form the first set of electrodes, the second set of electrodes, and the one or more floating transparent conductive islands of the touchscreen 102. The first set of electrodes, the second set of electrodes, and the one or more floating transparent conductive islands form one or more electrode patterns. The first transparent substrate and/or the second transparent substrate can be selectively patterned using a lithography process, such as photolithography to provide an example, and/or a screen printing process. The lithography process provides for a finer resolution than the screen printing process; however, overhead, such as equipment costs, mask design and setup, associated with the lithography process is much greater than the screen printing process. As such, the lithography process is often implemented when large unit volumes of the touchscreen 102 are to be fabricated, whereas the screen printing process is often implemented when small unit volumes of the touchscreen 102 are to be fabricated. Although embodiments of touchscreen fabrication are described herein based on the screen printing process, this is meant as illustrative and not restrictive of the spirit and scope of the present invention, as is readily understood by those skilled in the art.

Figures 2A, 2B:
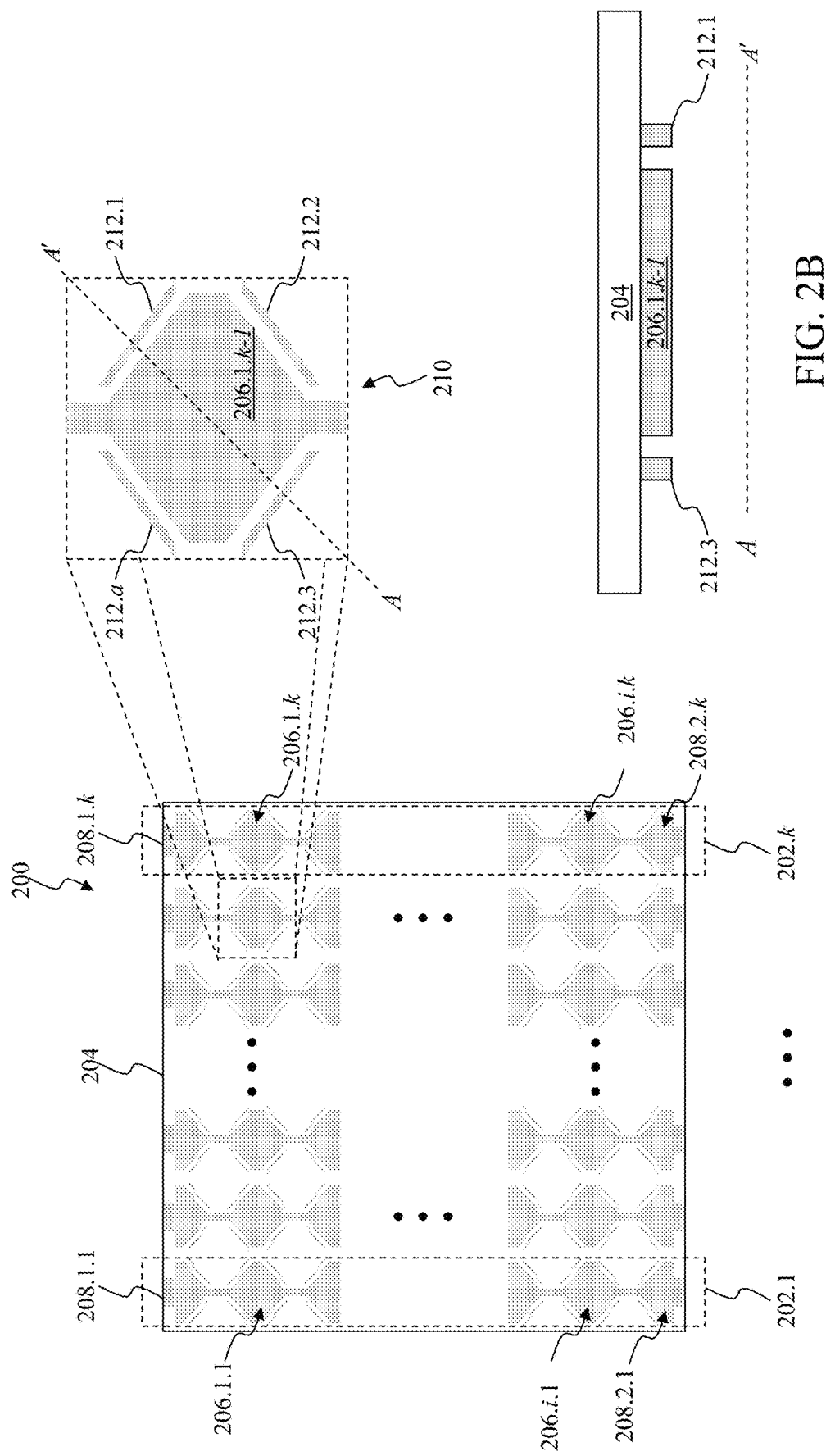
FIG. 2A and FIG. 2B illustrate an exemplary first electrode pattern that can be used to implement the touchscreen according to an exemplary embodiment of the present disclosure.

Exemplary Touchscreens That Can Be Implemented Within the Touch-Interactive Device According to an Exemplary Embodiment of the Present Disclosure First Exemplary Touchscreen FIG. 2A and FIG. 2B illustrate an exemplary first electrode pattern 200 that can be used to implement the touchscreen according to an exemplary embodiment of the present disclosure. Electrode pattern 200 includes vertical electrodes 202.1 through 202.$k$, configured and arranged in series of k columns, and a plurality of adjacent floating transparent conductive islands disposed on a transparent substrate 204. The transparent substrate 204 represents one or more optically transparent materials. The one or more non-conductive, optically transparent materials can be flexible or inflexible. In an exemplary embodiment, the transparent substrate 204 is implemented using a plate of glass.

The vertical electrodes 202.1 through 202.$k$ are oriented in a vertical direction, such as parallel to the y-axis of the Cartesian coordinate system and perpendicular to the x-axis of the Cartesian coordinate system. In this configuration and arrangement, the vertical electrodes 202.1 through 202.$k$ may be referred to as "X" electrodes due to their role in determining the x coordinates of the touch of the operator when present. However, those skilled in the relevant art(s) will recognize that the other configurations and arrangements for the vertical electrodes 202.1 through 202.$k$ are possible without departing from the spirit and scope of the present disclosure.

As illustrated in FIG. 2A, the vertical electrodes 202.1 through 202.$k$ include electrode pads 206.1.1 through 206.$i.k$ and electrode terminuses 208.1.1 through 208.2.$k$. In an exemplary embodiment, the electrode terminuses 208.1.1 through 208.2.$k$ represent interfaces between the electrode pads 206.1.1 through 206.$i.k$ and associated electronics, such as the associated mechanical housing and/or electronics 106 (FIG. 1), which can be electrically coupled to the associated electronics, such as by using one or more printed silver conductors on the transparent substrate 204 and/or one or more flex cables.

As additionally illustrated in FIG. 2A, the electrode pads 206.1.1 through 206.$i.k$ are configured and arranged in a series of i rows and a series of k columns on the transparent substrate 204. Similarly, the electrode terminuses 208.1.1 through 208.2.$k$ are configured and arranged in a series of two rows and a series of k columns on the transparent substrate 204. Suitable connections between the electrode pads 206.1.1 through 206.$i.k$ to corresponding electrode terminuses 208.1.1 through 208.2.$k$ form a corresponding vertical electrode from among the vertical electrodes 202.1 through 202.$k$. For example, the electrode pads 206.1.1 through 206.$i.$1 within a first column are mechanically and electrically connected to the electrode terminuses 208.1.1 through 208.2.1 from among a first column to form the vertical electrode 202.1. However, those skilled in the relevant art(s) will recognize that other groupings of the electrode pads 206.1.1 through 206.$i.k$ for one or more of the vertical electrodes 202.1 through 202.$k$ are possible without departing from the spirit and scope of the present disclosure.

As shown in FIG. 2A, electrode pads 206.1.1 through 206.$i.k$ can each have one or more floating transparent conductive islands adjacent to it. For example, each of electrode pads 206.1.1 through 206.$i.k$ can have four floating transparent conductive islands 212.1 through 212.$a$ adjacent to it, as illustrated in further detail with respect to electrode pad 206.1.$k$–1 located in a portion 210 of electrode pattern 200. Although four floating transparent conductive islands 212.1 through 212.$a$ are illustrated in FIG. 2A, those skilled in the relevant art(s) will recognize that other numbers of transparent conductive islands are possible without departing from the spirit and scope of the present disclosure. In an exemplary embodiment, the electrode pads 206.1.1 through 206.$i.k$ and the plurality of floating transparent conductive islands can be implemented using a suitable transparent conductor, e.g., indium-tin-oxide (ITO). Further, although the electrode pads 206.1.1 through 206.$i.k$ are implemented in a shape of a diamond in FIG. 2A, it should be appreciated that this is illustrative and not restrictive of the shape that can be implemented by those skilled in the relevant art(s).

As the term 'floating' implies, the plurality of floating transparent conductive islands represent shapes of transparent conductive material, which are not electrically connected within the electrodes 202.1 through 202.$k$. In an embodiment, the plurality of floating transparent conductive islands eliminate, or substantially reduce, one or more optical discontinuities that would be otherwise present in a touchscreen that includes electrodes 202.1 through 202.$k$.

FIG. 2B illustrates a cross-section of the portion 210 of electrode pattern 200 along the line A-A', and includes a cross-section of the transparent substrate 204, a cross-section of the electrode pad 206.1.$k$–1, a cross-section of the floating transparent conductive island 212.1, and a cross-section of the floating transparent conductive island 212.3. In an exemplary embodiment, the transparent substrate 204 is implemented as a plate of glass with an approximate thickness between a fraction of a millimeter to several millimeters, while the electrode pad 206.1.$k$–1 the floating transparent conductive island 212.1, and/or the floating transparent conductive islands 212.3 is implemented using a coating of ITO with an approximate thickness less than a wavelength of light. The cross-section of the portion 210 of electrode pattern 200 is to be further described with reference to FIG. 4B and FIG. 4D.

Figures 3A, 3B:
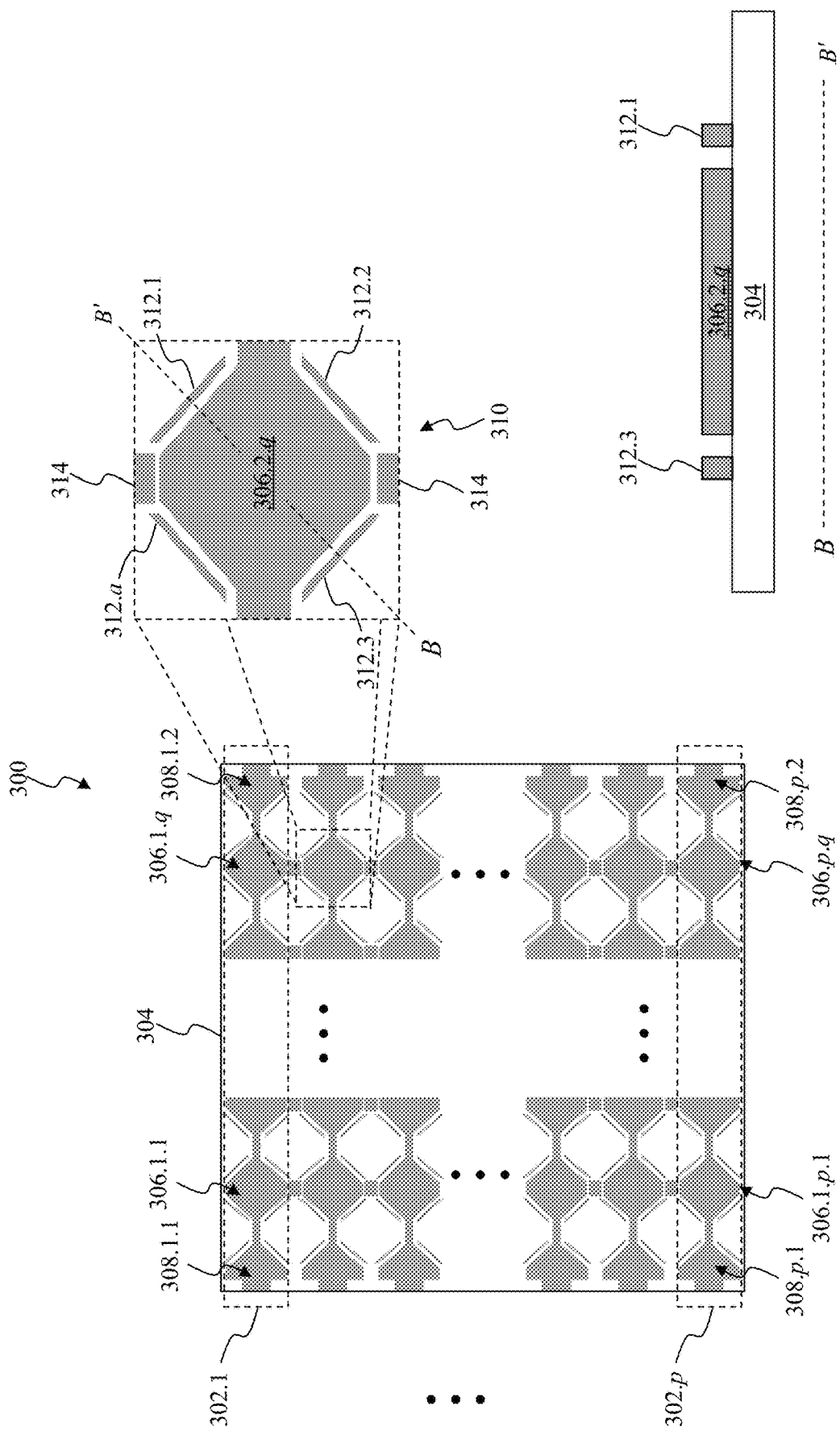
FIG. 3A and FIG. 3B illustrate an exemplary second electrode pattern that can be used to implement the touchscreen according to an exemplary embodiment of the present disclosure.

FIG. 3A and FIG. 3B illustrate an exemplary second electrode pattern 300 that can be used to implement the touchscreen according to an exemplary embodiment of the present disclosure. Second electrode pattern 300 includes horizontal electrodes 302.1 through 302.$p$, configured and arranged in a series of p rows, and a plurality of adjacent floating transparent conductive islands disposed on a transparent substrate 304. The transparent substrate 304 is substantially similar to the transparent substrate 204 and will not be discussed in further detail. However, those skilled in the relevant art(s) will recognize that the transparent substrate 304 can be implemented with a different material from the transparent substrate 204 without departing from the spirit and scope of the present disclosure.

In the exemplary embodiment illustrated in FIG. 3A, the horizontal electrodes 302.1 through 302.$p$ are oriented in a horizontal direction, such as perpendicular to the y-axis of the Cartesian coordinate system and parallel to the x-axis of the Cartesian coordinate system. In this configuration and arrangement, the horizontal electrodes 302.1 through 302.$p$ may be referred to as "Y" electrodes due to their role in determining the y coordinates of the touch of the operator when present. However, those skilled in the relevant art(s) will recognize that the other configurations and arrangements for the electrodes 302.1 through 302.$p$ are possible without departing from the spirit and scope of the present disclosure.

As illustrated in FIG. 3A, the horizontal electrodes 302.1 through 302.$p$ include electrode pads 306.1.1 through 306.$p$.$q$ and electrode terminuses 308.1.1 through 308.$p$.2. In an exemplary embodiment, the electrode terminuses 308.1.1 through 308.$p$.2 represent interfaces between the electrode pads 306.1.1 through 306.$p$.$q$ and associated electronics, such as the associated mechanical housing and/or electronics 106 (FIG. 1), which can be electrically coupled to the associated electronics, such as by using one or more printed silver conductors on the transparent substrate 304 and/or one or more flex cables.

As additionally illustrated in FIG. 3A, the electrode pads 306.1.1 through 306.$p$.$q$ are configured and arranged in a series of p rows and a series of q columns on the transparent substrate 304. Similarly, the electrode terminuses 308.1.1 through 308.$p$.2 are configured and arranged in a series of p rows and a series of two columns on the transparent substrate 304. Suitable connections between the electrode pads and corresponding electrode terminuses form a corresponding horizontal electrode. For example, the electrode pads 306.1.1 through 306.1.$q$ are mechanically and electrically connected to the electrode terminuses 308.1.1 through 308.1.2 to form the horizontal electrode 302.1. However, those skilled in the relevant art(s) will recognize that other groupings of the electrode pads 306.1.1 through 306.$p$.$q$ for one or more of the horizontal electrodes 302.1 through 302.$p$ are possible without departing from the spirit and scope of the present disclosure.

As shown in FIG. 3A, electrode pads 306.1.1 through 306.$p$.$q$, can each have one or more floating transparent conductive islands adjacent to it. For example, each of electrode pads 306.1.1 through 306.$p$.$q$ can have floating transparent conductive islands 312.1 through 312.$a$ and floating transparent conductive islands 314 adjacent to it, as illustrated in further detail with respect to electrode pad 306.2.$q$ located in a portion 310 of electrode pattern 300. In an embodiment, the electrode pads 306.1.1 through 306.$p$.$q$ and the plurality of floating transparent conductive islands of electrode pattern 300 are substantially similar to the electrode pads 206.1.1 through 206.$i$.$k$ and the plurality of floating transparent conductive islands of electrode pattern 200, respectively; therefore, only differences are discussed in further detail herein.

FIG. 3B illustrates a cross-section of the portion 310 of electrode pattern 300 along the line B-B', which includes a cross-section of the transparent substrate 304, a cross-section of the electrode pad 306.2.$q$, a cross-section of the floating transparent conductive island 312.1, and a cross-section of the floating transparent conductive island 312.3.

The cross-section of the portion 310 of electrode pattern 300 is to be further described with reference to FIG. 4B and FIG. 4D.

Figure 4A:
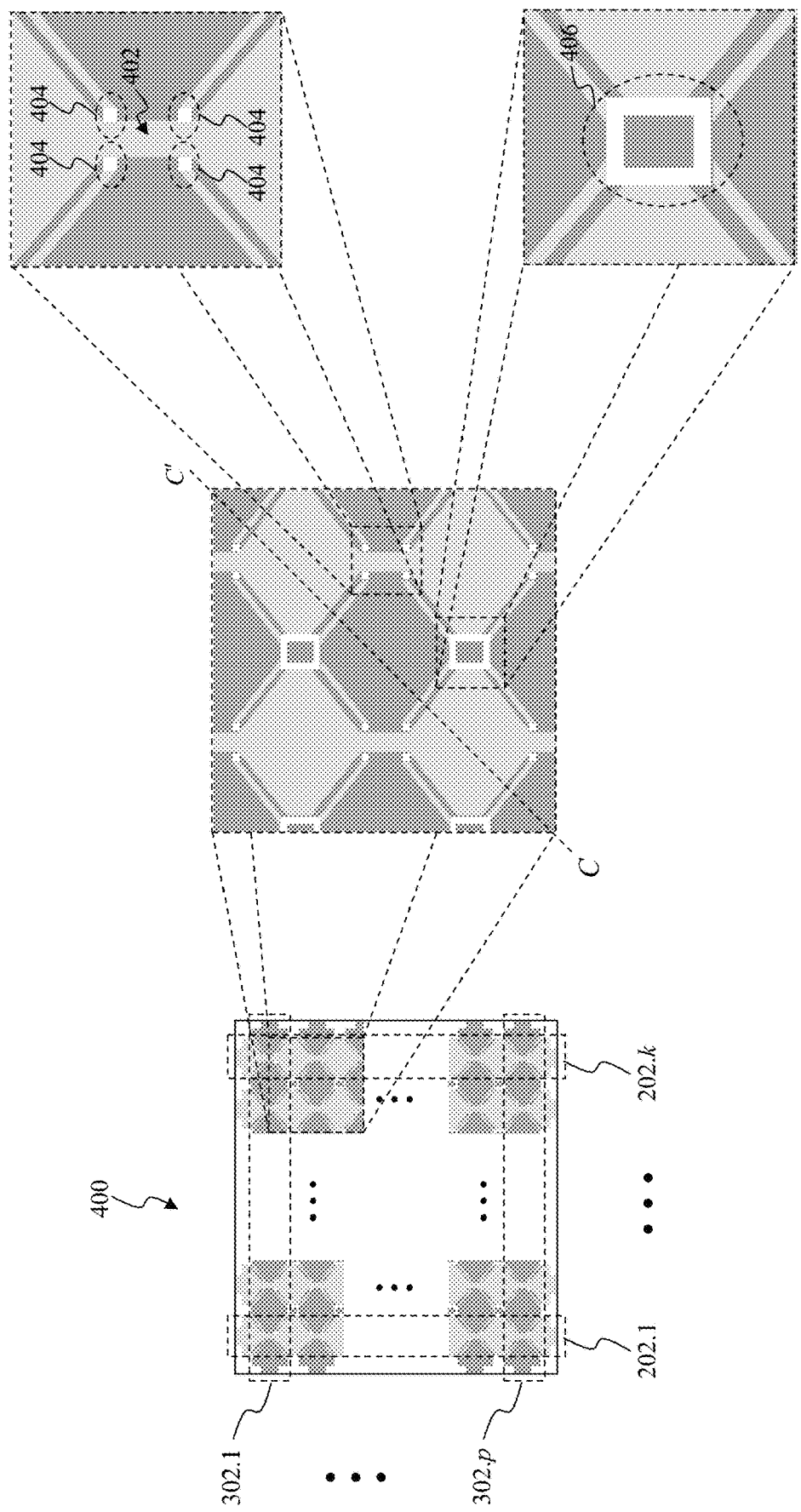
FIG. 4A through FIG. 4D illustrate a first exemplary touchscreen according to an exemplary embodiment of the present disclosure.

FIG. 4A through FIG. 4D illustrate a first exemplary touchscreen 400 according to an exemplary embodiment of the present disclosure. As illustrated in FIG. 4A, the first electrode pattern 200, illustrated in "light gray," and the second electrode pattern 300, illustrated in "dark gray," are overlaid on top of each other to form the touchscreen 400. In an embodiment, transparent substrates 204 and 304 are attached to each other (with the electrode patterns 200 and 300 facing each other) with an optically clear adhesive (OCA) to form the touchscreen 400. As illustrated in FIG. 4A, the vertical electrodes 202.1 through 202.$k$ are placed side-by-side in a horizontal direction where each successive vertical electrode 202.1 to 202.$k$ has an increasing x coordinate in a Cartesian coordinate system to provide an example. Similarly, the horizontal electrodes 302.1 through 302.$p$ are placed one-above-the-other in a vertical direction where each successive horizontal electrode 302.1 to 302.$q$ has an increasing y coordinate in a Cartesian coordinate system to provide an example, to form the touchscreen 400. In an exemplary embodiment, the touchscreen 400 represents a projected capacitive (PCAP) touchscreen.

FIG. 4A additionally illustrates a portion of the touchscreen 400 in further detail. As discussed above, the touchscreen 400 is formed by overlaying electrode patterns 200 and 300 on top of each other. Ideally, when electrode patterns 200 and 300 are overlaid on top of each other, a single layer of transparent conductive material can be perceived by the human eye when viewing the touchscreen 400. However, in some situations, one or more optical discontinuities may be present in the touchscreen 400.

As illustrated in FIG. 4A, one or more first regions 402 represent one or more first optical discontinuities having two or more layers of transparent conductive material formed by the overlaying of electrode patterns 200 and 300. For example, the one or more first regions 402 result from connections among columns of the electrode pads 206.1.1 through 206.$i$.$k$ (of electrode pattern 200) overlaying corresponding connections among rows of the electrode pads 306.1.1 through 306.$p$.$q$ (of electrode pattern 300).

As further illustrated in FIG. 4A, one or more second regions 404 and 406, illustrated in "white" in FIG. 4A, represent one or more second optical discontinuities having no layers of transparent conductive material formed by the overlaying of electrode patterns 200 and 300. The one or more second regions 404 represent regions having no layers of transparent conductive material at the ends of the floating transparent conductive islands 212.1 through 212.$a$ (of electrode pattern 200) and/or the floating transparent conductive islands 312.1 through 312.$a$ (of electrode pattern 300). Similarly, the one or more second regions 406 represent regions having no layers of transparent conductive material between the electrode pads 206.1.1 through 206.$i$.$k$ and the electrode pads 306.1.1 through 306.$p$.$q$ and associated floating transparent conductive islands.

Figure 4B:
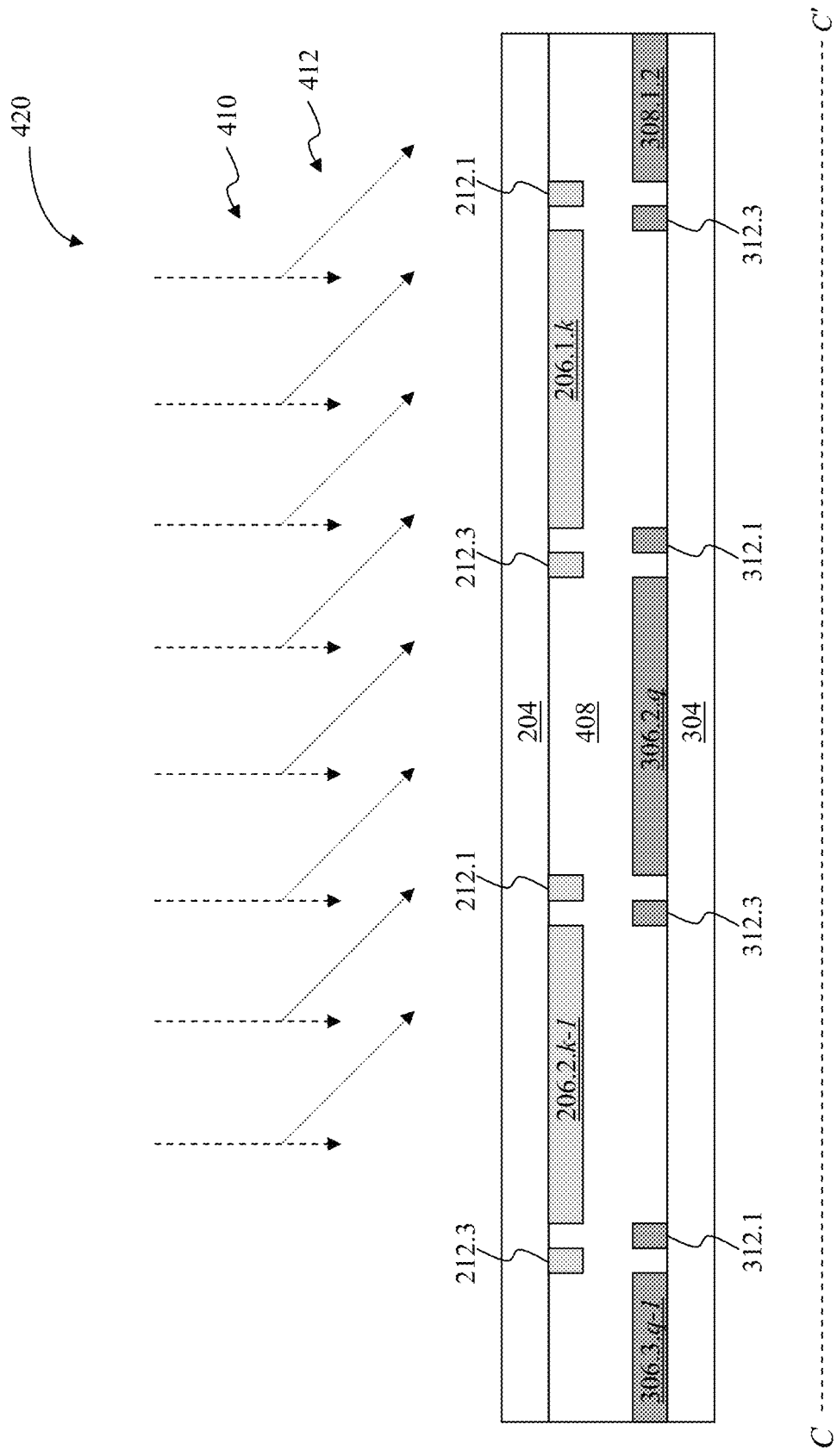

FIG. 4B illustrates a cross-section 420 of the portion of the touchscreen 400 along the line C-C', which includes a cross-section of electrode pattern 200, namely a cross-section of transparent substrate 204, electrode pads 206.1.$k$–1 and 206.2.$k$, the floating transparent conductive islands 212.1 (adjacent to each of electrode pads 206.1.$k$–1 and 206.2.$k$), and the floating transparent conductive islands 212.3 (adjacent to each of electrode pads 206.1.$k$–1 and 206.2.$k$), and a cross-section of electrode pattern 300, namely, a cross-section of the transparent substrate 304, electrode pad 306.3.$q$−1, electrode pad 306.2.$q$, and electrode terminus 308.1.1, the floating transparent conductive islands 312.1 (adjacent to electrode pads 306.3.$q$−1 and 306.2.$q$), and the floating transparent conductive islands 312.3 (adjacent to electrode pad 306.2.$q$ and electrode terminus 308.1.2). Transparent substrates 204 and 304 are attached using an optically clear adhesive (OCA) 408 to form the touchscreen 400. As referenced throughout herein, OCA can be an acrylic-based adhesive, a silicone-based adhesive, polyvinyl butyral (PVB), ethylene-vinyl acetate (EVA), or any other suitable OCA that will be recognized by those skilled in the relevant art(s).

As illustrated in FIG. 4B, electrode patterns 200 and 300 are overlaid on top of each other in such a manner that there is little to no overlap and little to no horizontal separation between electrode pads 206.2.$k$−1 and 206.1.$k$, the floating transparent conductive islands 212.1, and/or the floating transparent conductive islands 212.3 of electrode pattern 200 and electrode pads 306.3.$q$−1 and 306.2.$q$, electrode terminus 308.1.2, the floating transparent conductive islands 312.1, and/or the floating transparent conductive islands 312.3 of second electrode pattern 300. As such, the cross-section of the portion of the touchscreen 400 can be perceived by the human eye as having a continuous, single layer of transparent conductive material when viewed from above in a normal direction 410 that is perpendicular, or approximately perpendicular, to the cross-section of the portion of the touchscreen 400.

In an embodiment, the boundary alignment illustrated in FIG. 4B between respective elements of electrode pattern 200 and electrode pattern 300 (i.e., no or minimal overlap and no or minimal horizontal separation or gap) is achieved in accordance with an etch resolution of the fabrication process used to create electrode patterns 200 and 300. For example, in the case of fabrication using a screen printing process, due to the screen printing process for depositing etchant, and the etching process itself, there is a minimum separation between an electrode pad and an associated floating island below which electrical separation is not assured. As a typical touchscreen contains thousands of floating islands, reliable electrical separation at a high statistical level is desired. This minimum separation is denoted herein as the "etch resolution" of the fabrication process. A representative value of etch resolution is 200 microns, or more generally in a range from 100 to 300 microns. The resolution of the screen printing process for depositing etchant on a ITO coated glass contributes to the etch resolution as does bleeding or spreading of the etchant during the etch reaction itself.

However in some situations, the cross-section of the portion of the touchscreen 400 can be perceived by the human eye as not being the single layer of transparent conductive material when viewed from above in an angular direction 412 that is offset from the normal direction 410. For example, some portions of the cross-section of the portion of the touchscreen 400 can be perceived as including no layers of the transparent conductive material and/or two layers of the transparent conductive when viewed from above in the angular direction 412 causing one or more optical discontinuities within the cross-section of the portion of the touchscreen 400. Ideally, these one or more optical discontinuities can be difficult to perceive by a human eye when viewing the cross-section of the portion of the touchscreen 400. However, in some situations, the one or more optical discontinuities can be perceived by the human eye when viewing the cross-section of the portion of the touchscreen 400 in the angular direction 412.

For example, the single layer of transparent conductive material may not be present in the cross-section of the portion of the touchscreen 400 when viewed from above in the angular direction 412 that is offset from the normal direction 410, and/or the transparent substrate 204 may be horizontally shifted relative to the transparent substrate 304 when the transparent substrate 204 and the transparent substrate 304 are attached to form the touchscreen 400. In this example, conventional ray-tracing analysis would lead those skilled in the relevant art(s) to expect that some portions of the cross-section of the portion of the touchscreen 400 can be perceived as including no layers of the transparent conductive material and/or two layers of the transparent conductive material when viewed from above in the angular direction 412 causing one or more optical discontinuities within the touchscreen 400. However, it has been discovered experimentally through perception tests that these one or more optical discontinuities within the touchscreen 400 are not necessarily perceived by the human eye when viewing the cross-section of the portion of the touchscreen 400 in the angular direction 412. Although these one or more optical discontinuities are present in the touchscreen 400, one or more factors, such as a resolution of the human eye at a viewing distance typical of commercial touchscreen applications, a width range of floating transparent conductive islands 212.1 through 212.$a$ and floating transparent conductive islands 312.1 through 312.$a$ based on the capabilities of the screen printing processes, and/or a thickness of optically clear adhesive (OCA) 408 separating the first electrode pattern 200 and the second electrode pattern 300 to provide some examples, can cause these one or more optical discontinuities to be difficult to be perceived by the human eye when viewing the touchscreen 400 from above in the angular direction 412. Specifically, the inventors of the present disclosure have discovered that this is the case when the resolution of the human eye is approximately 200 microns, which corresponds to a viewing distance of commercial electronic devices, when the width of range of the floating transparent conductive islands 212.1 through 212.$a$, the floating transparent conductive islands 312.1 through 312.$a$, and/or corresponding gaps are approximately 200 microns or larger, which corresponds to the capabilities of the screen printing processes, and/or when the thickness of the optically clear adhesive (OCA) 408 separating the first electrode pattern 200 and the second electrode pattern 300 is approximately 200 microns.

The exemplary embodiment as illustrated in FIG. 4A and FIG. 4B is of particular interest in the design of PCAP touchscreens that are manufactured using the screen printing processes. In particular, this exemplary embodiment accounts for both electronic and optical performance.

For example, a typical center-to-center spacing between the vertical electrodes 202.1 through 202.$k$ and the horizontal electrodes 302.1 through 302.$p$ is related to a size of the human finger, and thus, is between approximately 5 mm and approximately 7 mm to ensure that a touch from the operator overlaps multiple vertical electrodes 202.1 through 202.$k$ and/or multiple horizontal electrodes 302.1 through 302.$p$ to provide for efficient determination of a location of the touch without unnecessarily increasing the total number of electronics and hence channels of electronics.

Further, a typical width of the floating transparent islands 212.1 through 212.$a$ and/or the floating transparent conductive islands 312.1 through 312.$a$ can be a factor of ten or more less than the center-to-center spacing between the vertical electrodes 202.1 through 202.$k$ and the horizontal electrodes 302.1 through 302.$p$, e.g., approximately 250 microns; however, the width of floating transparent islands 212.1 through 212.$a$ and/or the floating transparent conductive islands 312.1 through 312.$a$ can range from approximately 200 microns to approximately 500 microns or beyond. This typical width and width range also apply to the width of gaps between an electrode pad 206 and floating transparent conductive islands 212.1 through 212.$a$, as well as between an electrode pad 306 and floating transparent conductive islands 312.1 through 312.$a$. It is of significance to note that while gaps between approximately 200 microns and approximately 500 micron can be reliably fabricated by the screen printing process, gaps significantly narrower than 200 microns are problematic with the screen printing process. Thus, the exemplary embodiment as illustrated in FIG. 4A and FIG. 4B can provide designs for the touchscreen 400 that are compatible with the screen printing processes.

Figure 4C:
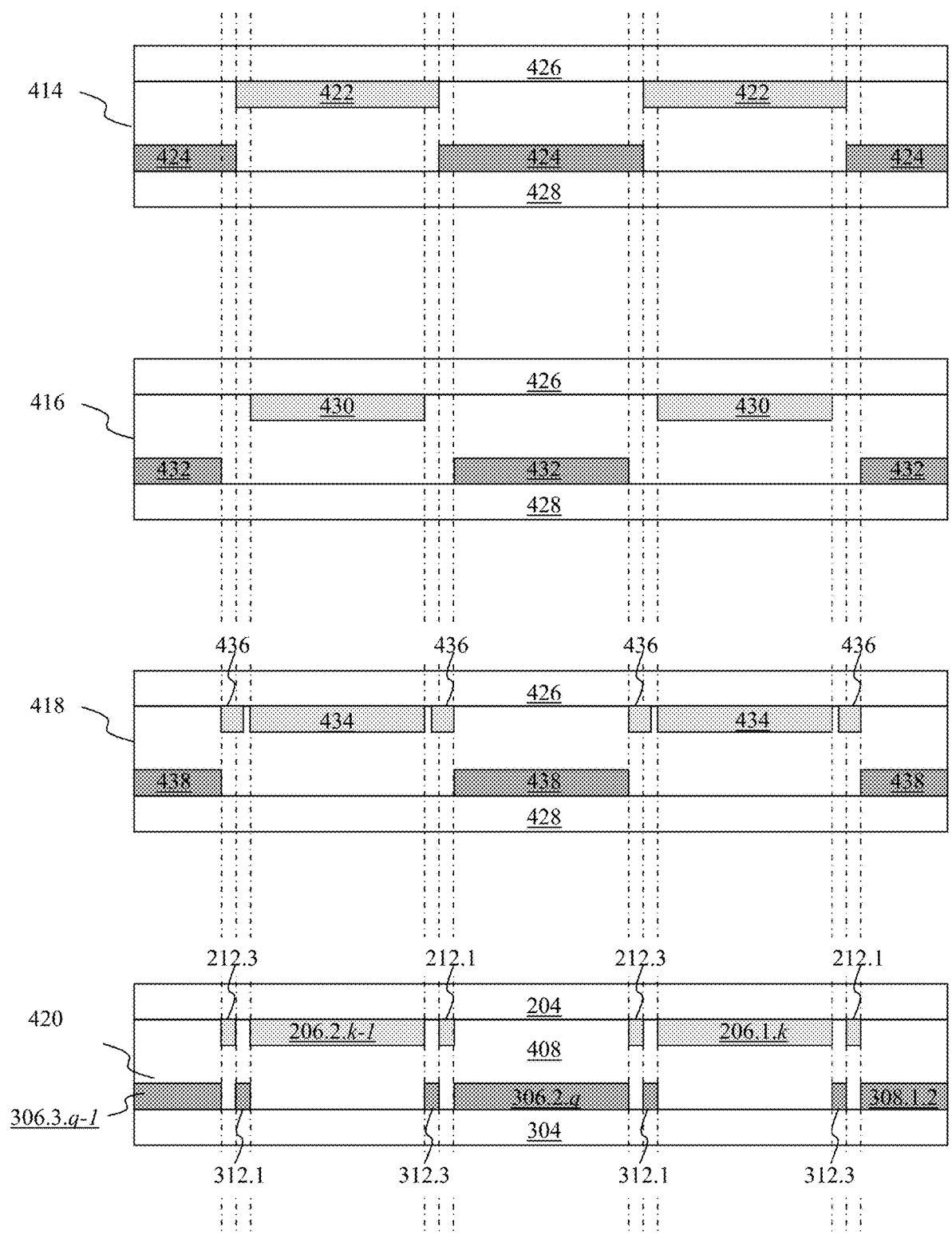
Figure 7A:
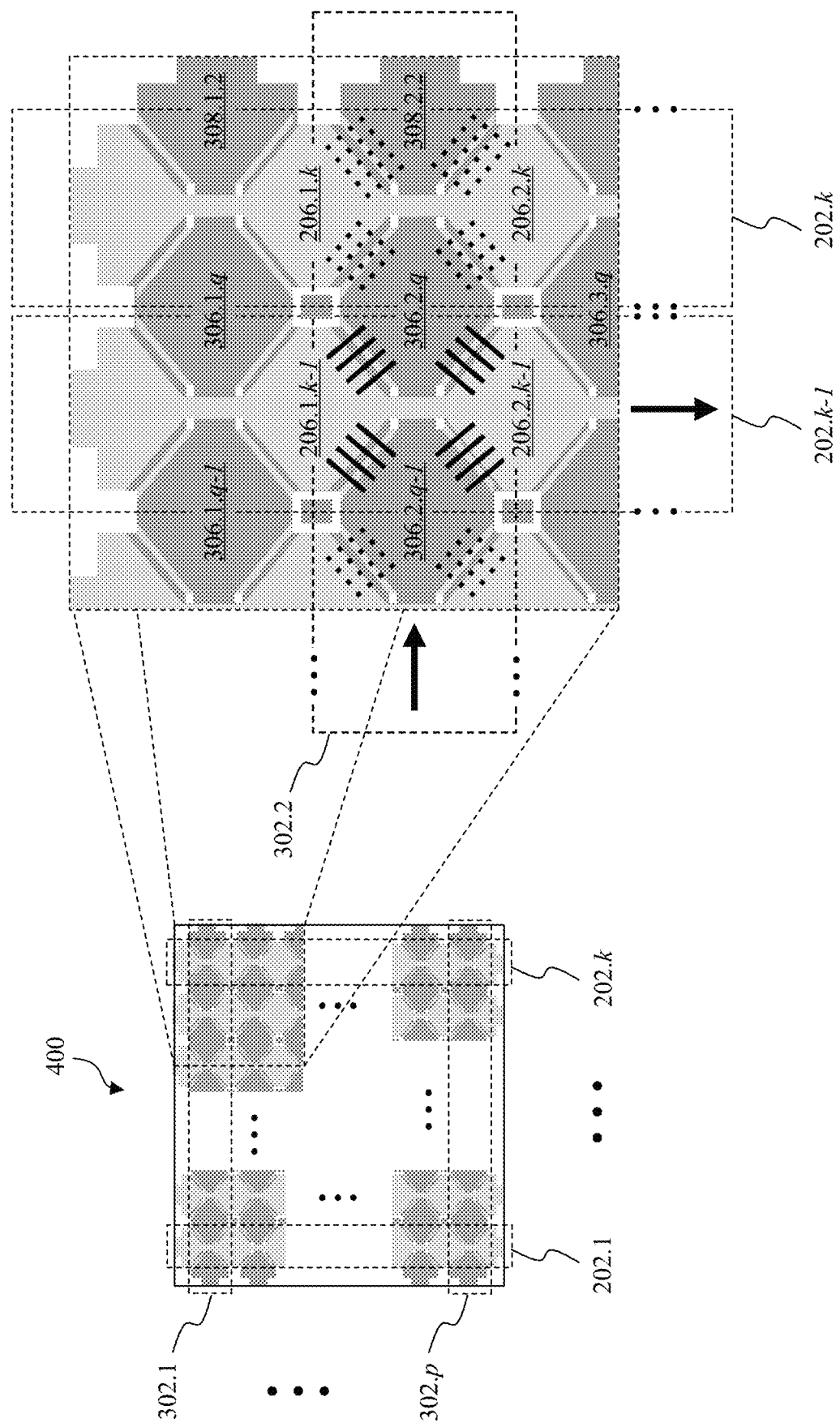
FIGS. 7A and 7B illustrate operation of the first exemplary touchscreen according to an exemplary embodiment of the present disclosure.
Figure 7B:
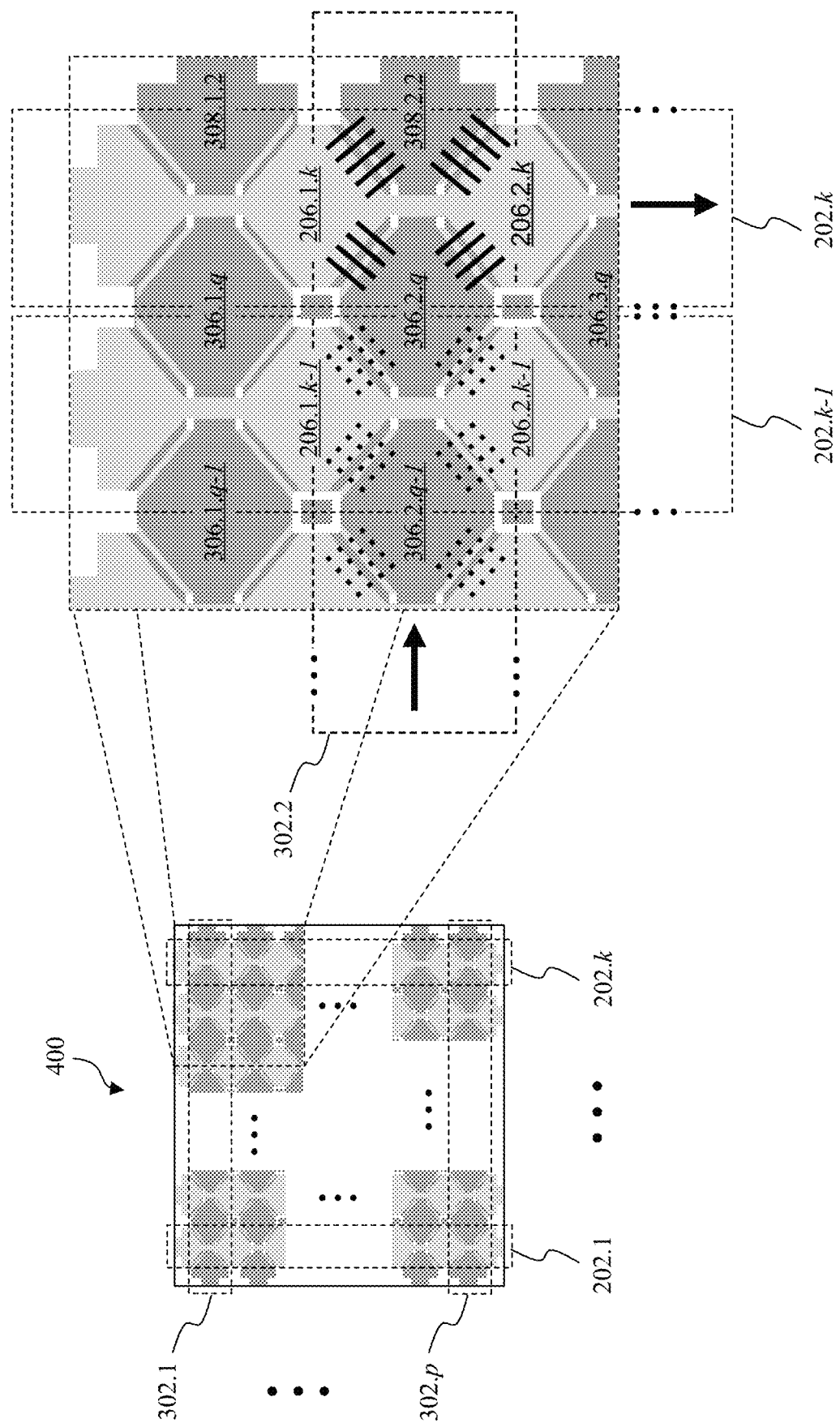

FIG. 4C illustrates a comparison of the cross-section 420 of the portion of the touchscreen 400 along the line C-C' with cross-sections 414, 416, 418 of conventional touchscreens. Referring to the cross-section 414, the simplest conventional design which is compatible with ITO patterning with the screen printing process is represented, and includes ITO material 422 and ITO material 424 that are selectively patterned onto a first plate of glass 426 and a second plate of glass 428, respectively. The configuration and arrangement of the ITO material 422 and the ITO material 424 provides a single, approximately substantially uniform, layer of the ITO for the cross-section 414 when viewed in a normal direction, such as the normal direction 410 to provide an example, that is perpendicular, or approximately perpendicular, to the cross-section 414. Although this configuration and arrangement of the cross-section 414 can satisfy optical and manufacturability goals for this conventional touchscreen, this configuration and arrangement of the cross-section can lead to diminished electronic performance. A key electronic figure of merit, which is to be discussed in further detail below with reference to FIGS. 7A and 7B, is the touch-sensitivity ratio $\Delta C_M/C_M$, which typically is desired to be large to aid touch detection operation. Because edges of ITO material 422 and the ITO material 424 are in close proximity in this arrangement, there is a relatively large contribution to the mutual capacitance, $C_M$, which is minimally affected by a relatively remote touch of the operator on a surface of the first plate of glass 426, that is, for which the corresponding contribution to $\Delta C_M$ is small.

Turning to the cross-section 416 of a second conventional touchscreen, ITO material 430 and ITO material 432 are included and selectively patterned onto the first plate of glass 426 and the second plate of glass 428, respectively. The cross-section 416 is a much better design than the cross-section 414 in terms of electronic performance, since it provides a much better value for the touch-sensitivity ratio $\Delta C_M/C_M$ when compared to the cross-section 414. However, this increased electronic performance leads to relatively large gaps, for example approximately 500 microns, between the ITO material 430 and the ITO material 432 which diminishes optical performance, since they are sufficiently large to be perceived by a human eye when viewing the cross-section 416 in the normal direction.

As further illustrated in FIG. 4C, the cross-section 418 of a third conventional touchscreen includes ITO material 434 and ITO islands 436 and ITO material 438 that are selectively patterned onto the first plate of glass 426 and the second plate of glass 428, respectively. The cross-section 418 alleviates the diminished optical performance of the cross-section 416 with the inclusion of the ITO islands 436. Gaps between the ITO material 434 and the ITO islands 436 are very narrow, such as 50 microns or less, so as to be difficult to be perceived by a human eye when viewing the cross-section 418. These gaps are sufficiently small that a lithography process, as opposed to a screen printing process, is needed to be used, since the screen-printing process does not have the necessary resolution to print gaps of these sizes. For consumer electronic devices, which have a tendency to be manufactured in higher quantities, such as millions of units, the lithography process is often utilized. But, overhead associated with the lithography process can prevent the lithography process from being used in manufacturing lower quantities, such as those of commercial electronic devices. In these situations, the screen printing process is preferred. None of the cross-sections 414, 416, and 418 represent cross-sections of portions of conventional touchscreens that provide a design with both optical and electronic performance and compatibility with screen printing manufacturing processes as does the touchscreen 400 as described with reference to FIG. 4A, FIG. 4B, and FIG. 4D.

Figure 4D:
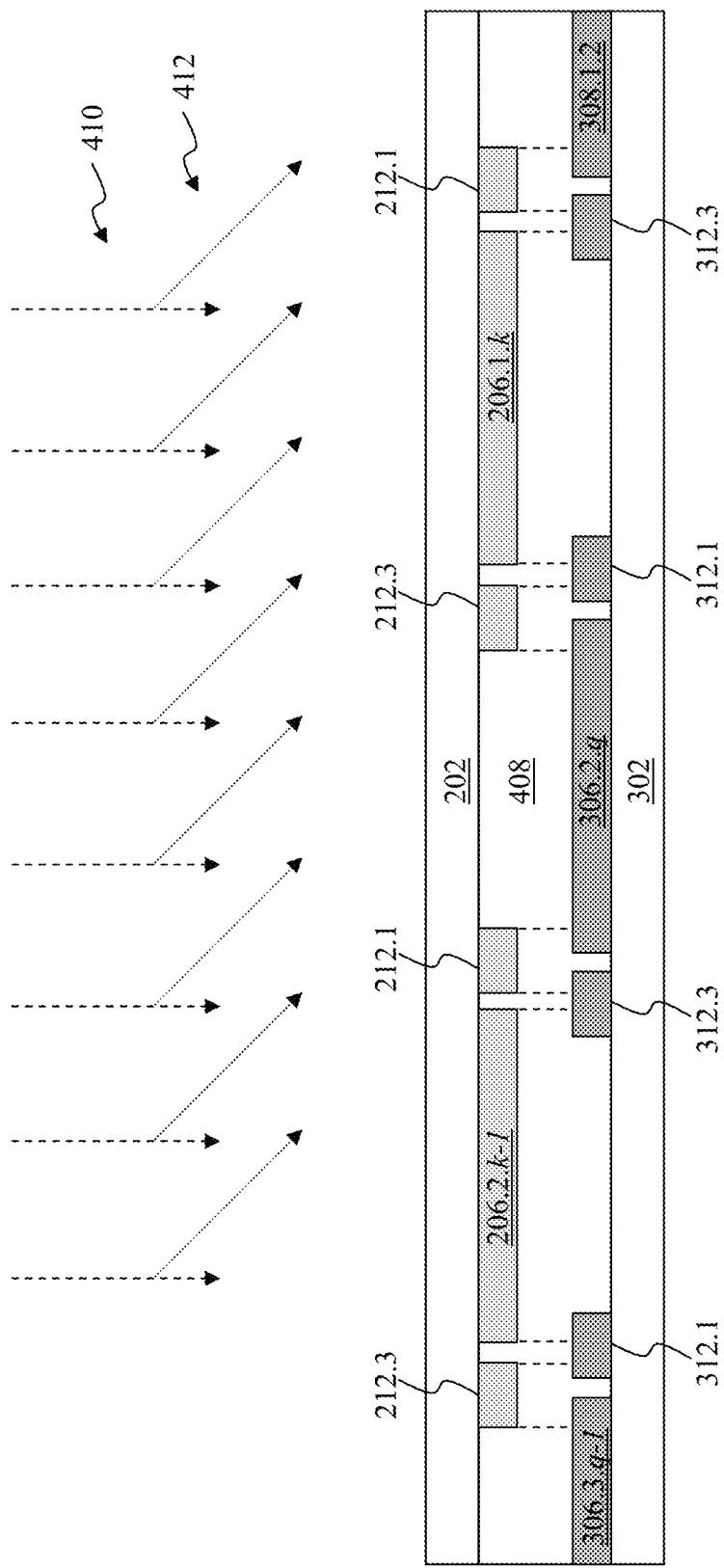

Referring now to FIG. 4D, an alternate cross-section of the portion of the touchscreen 400 along the line C-C' according to an embodiment is illustrated. The alternate embodiment illustrated in FIG. 4D may be suitable in situations where the one or more optical discontinuities, discussed with reference to FIG. 4B above, can be perceived by the human eye when viewing the cross-section of the portion of the touchscreen 400 in the angular direction 412. Such parallax effects may occur and can be stronger, for example, when there is a greater distance between the first electrode pattern 200 and the second electrode pattern 300. Alternatively or additionally, if the touchscreen 400 and its associated display are smaller in size, the human eye is likely to view the touchscreen 400 and its associated display from a shorter distance and hence have a higher resolution in terms of microns of distance within the ITO electrode patterns. Also, some applications may demand a wider range of viewing angles.

In the alternate embodiment of FIG. 4D, the floating transparent conductive islands 212.1, and/or the floating transparent conductive islands 212.3 of the first electrode pattern 200 can be extended to overlap electrode pads 306.3.$q$-1 and 306.2.$q$, electrode terminus 308.1.2, the floating transparent conductive islands 312.1, and/or the floating transparent conductive islands 312.3 of the second electrode pattern 300 Additionally, the floating transparent conductive islands 312.1, and/or the floating transparent conductive islands 312.3 of the second electrode pattern 300 can be extended to overlap electrode pads 206.2.$k$-1 and 206.1.$k$, the floating transparent conductive islands 212.1, and/or the floating transparent conductive islands 212.3 of the first electrode pattern 200. As such, the cross-section of the portion of the touchscreen 400 can be perceived by the human eye as not having any high-contrast discontinuities between regions with no layers of transparent conductive material and two or one layers of the transparent conductive material when viewed from above in the angular direction 412.

Second Exemplary Touchscreen

Figure 5A:
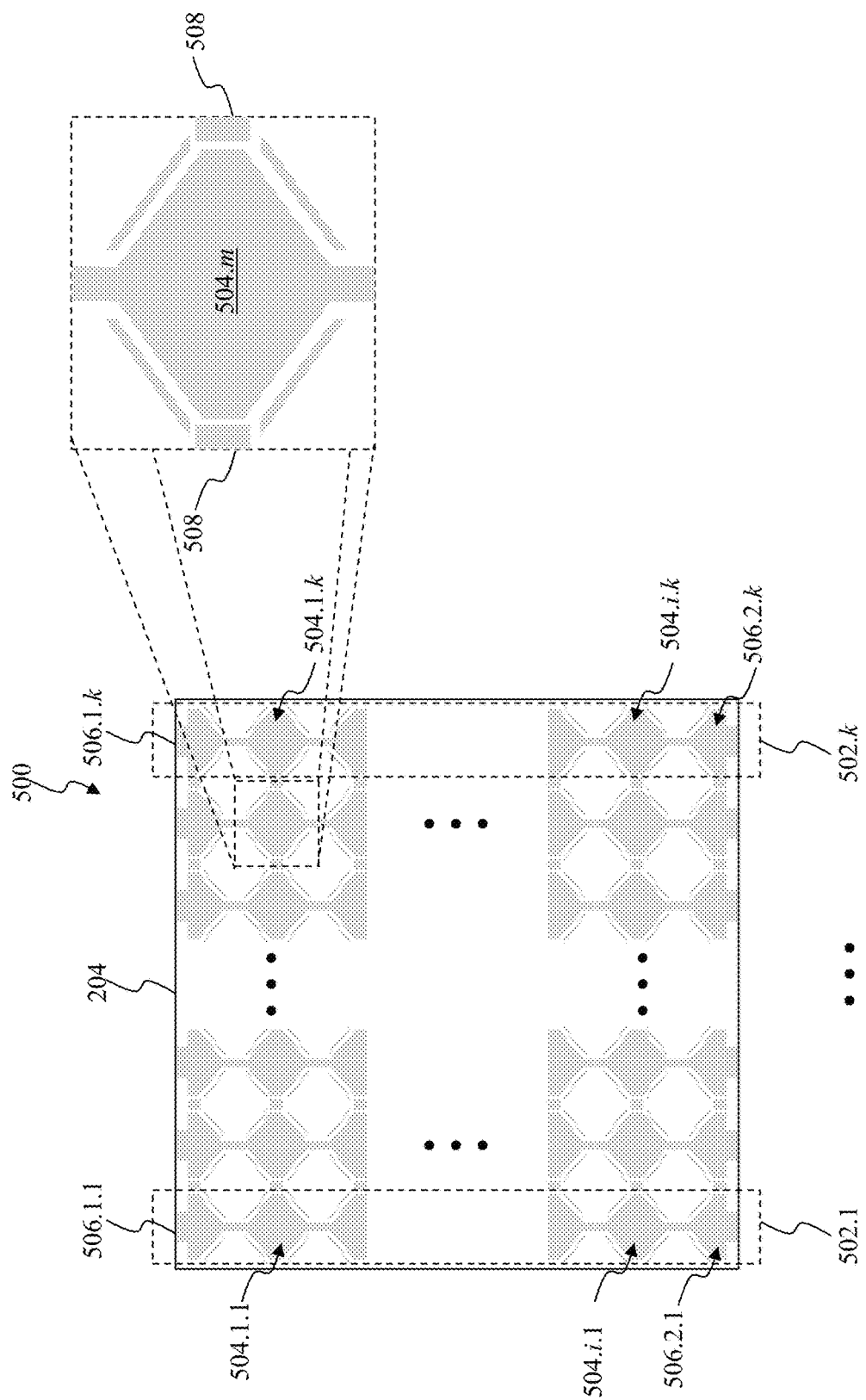
FIG. 5A through FIG. 5C illustrate a second exemplary touchscreen according to an exemplary embodiment of the present disclosure.
Figure 5B:
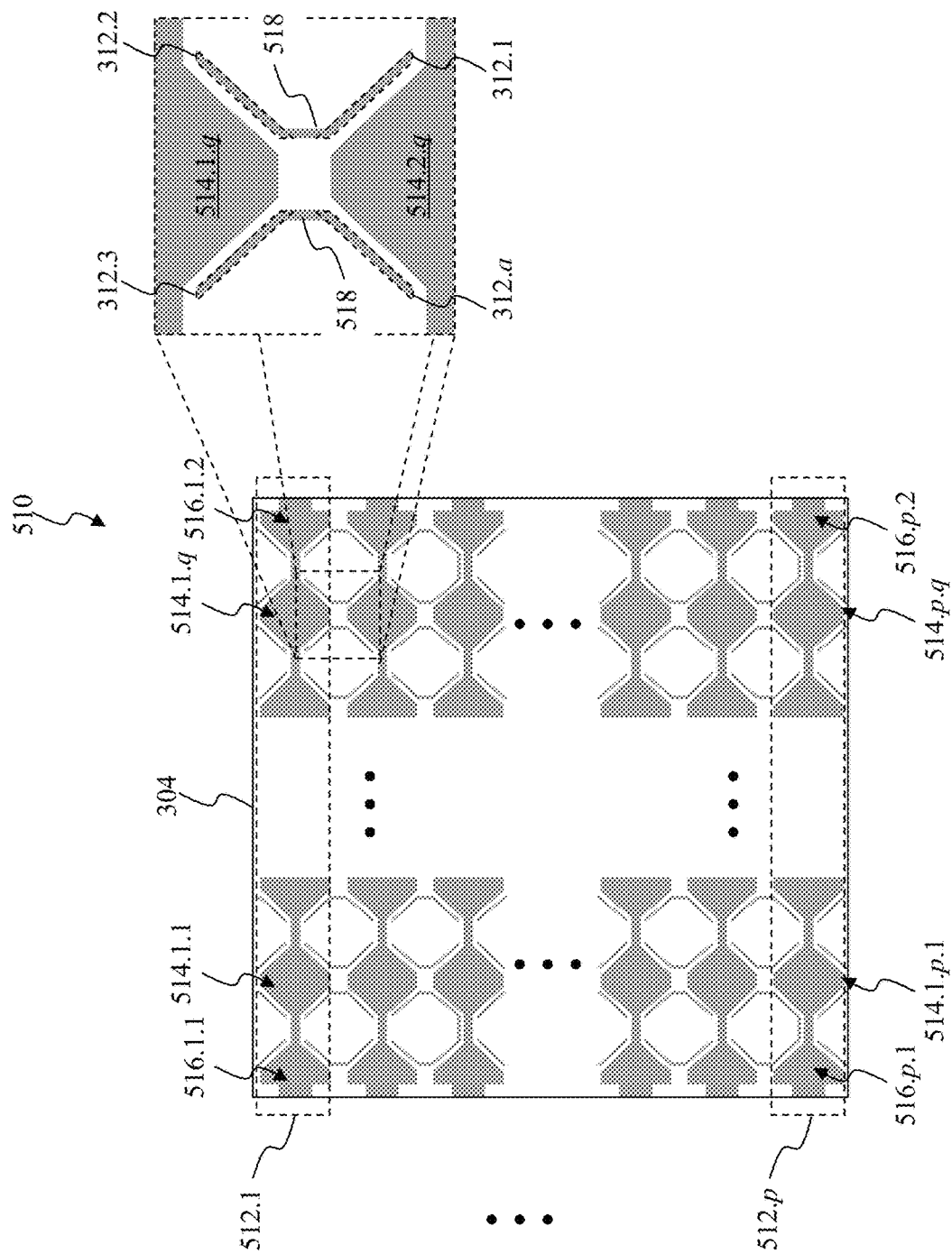
Figure 5C:
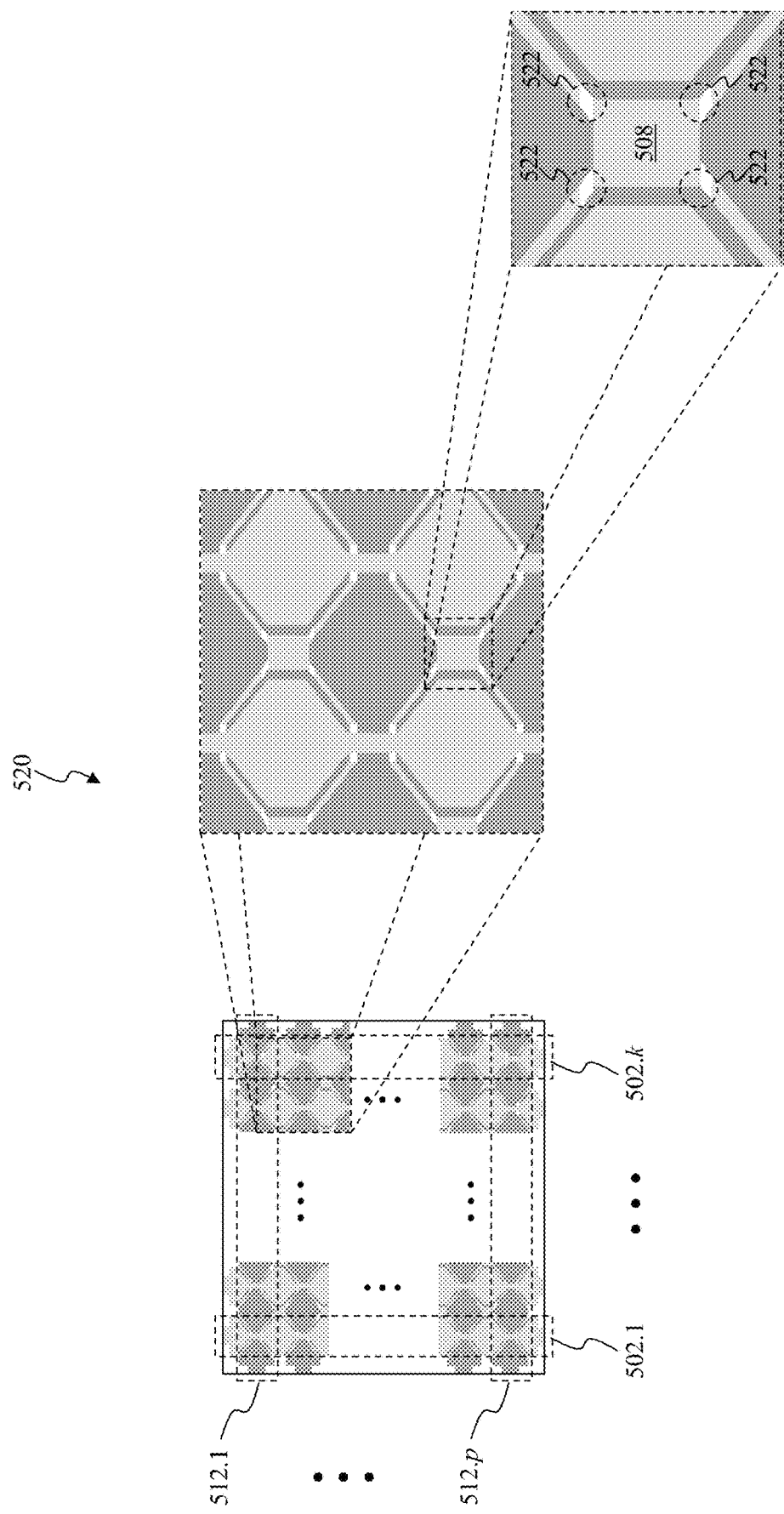

FIG. 5A through FIG. 5C illustrate a second exemplary touchscreen according to an exemplary embodiment of the present disclosure. As illustrated in FIG. 5A, a first electrode pattern 500 includes vertical electrodes 502.1 through 502.$k$ that are configured and arranged in a series of k columns on the transparent substrate 204 and are oriented in a vertical direction, such as perpendicular to the x-axis of the Cartesian coordinate system. The vertical electrodes 502.1 through 502.$k$ include electrode pads 504.1.1 through 504.$i$.$k$ and electrode terminuses 506.1.1 through 506.2.$k$. The vertical electrodes 502.1 through 502.$k$ are substantially similar to the vertical electrodes 202.1 through 202.$k$. As such, the electrode pads 504.1.1 through 504.$i.k$ and electrode terminuses 506.1.1 through 506.2.$k$ are substantially similar to the electrode pads 206.1.1 through 206.$i.k$ and electrode terminuses 208.1.1 through 208.2.$k$, respectively. Therefore, only differences between these electrodes, electrode pads, and electrode terminuses are to be discussed in further detail. In addition, electrode pattern 500 may include a plurality of floating transparent conductive islands adjacent to each of electrode pads 504.1.1 through 504.$i.k$ and electrode terminuses 506.1.1 through 506.2.$k$.

To illustrate the differences between these electrodes, electrode pads, and electrode terminuses, an electrode pad 504.$m$ from among the electrode pads 504.1.1 through 504.$i.k$ is illustrated in further detail in FIG. 5A. As shown, electrode pad 504.$m$ has four adjacent floating transparent conductive islands, disposed in a similar fashion as floating islands 212.1 through 212.$a$ described above. Further, one or more floating transparent conductive islands 508 may be disposed adjacent to electrode pad 504.$m$. The one or more floating transparent conductive islands 508 are substantially similar to the one or more floating transparent conductive islands 314 as described in FIGS. 3A and 3B except the one or more floating transparent conductive islands 508 are on the transparent substrate 204 with the vertical electrodes 502.1 through 502.$k$ rather than on the transparent substrate 304 with the horizontal electrodes 302.1 through 302.$p$, and are slightly taller in the vertical direction.

As illustrated in FIG. 5B, a second electrode pattern 510 includes horizontal electrodes 512.1 through 512.$p$ that are configured and arranged in a series of p rows on the transparent substrate 304 oriented in a horizontal direction, such as perpendicular to the y-axis of the Cartesian coordinate system. The horizontal electrodes 512.1 through 512.$p$ include electrode pads 514.1.1 through 514.$p.q$ and electrode terminuses 516.1.1 through 516.$p$.2, and are substantially similar to the horizontal electrodes 302.1 through 302.$p$. As such, the electrode pads 514.1.1 through 514.$p.q$ and electrode terminuses 516.1.1 through 516.$p$.2 are substantially similar to the electrode pads 306.1.1 through 306.$p.q$ and the electrode terminuses 308.1.1 through 308.$p$.2, respectively. Therefore, only differences between these electrodes, electrode pads, and electrode terminuses are to be discussed in further detail. In addition, electrode pattern 510 may include a plurality of floating transparent conductive islands adjacent to each of electrode pads 514.1.1 through 514.$p.q$ and electrode terminuses 516.1.1 through 516.$p$.2.

To illustrate the differences between these electrodes, electrode pads, and electrode terminuses, a region of the second electrode pattern 510 is illustrated in further detail in FIG. 5B. As illustrated in FIG. 5B, floating transparent conductive islands, such as the floating transparent conductive islands 312.1 through 312.$a$ illustrated in FIG. 3, between adjacent electrode pads in each column of the series of q columns of the electrode pads 514.1.1 through 514.$p.q$ are connected with the same or optically similar materials to form one or more floating transparent conductive islands 518. For example, the floating transparent conductive islands 312.2 and 312.3 of the electrode pad 514.1.$q$ are connected to the floating transparent conductive islands 312.1 and 312.$a$ of the electrode pad 514.2.$q$ as illustrated in the region of the second electrode pattern 510 in FIG. 5B. The connections between floating transparent conductive islands 312.2 and 312.1 and between floating transparent conductive islands 312.3 and 312.$a$ serve no beneficial electronic purpose, and are provided to reduce the size of regions with no layers of ITO relative to region 406 of touchscreen 400. Also, as the ends of the floating islands tend to be locations of mask emulsion wear, the second electrode pattern 510 in FIG. 5B has the additional advantage of increasing mask durability by reducing the number of floating island ends.

As illustrated in FIG. 5C, the first electrode pattern 500, illustrated in "light gray," and the second electrode pattern 510, illustrated in "dark gray," are overlaid on top of each other and attached with an optically clear adhesive (OCA) to form the touchscreen 520. As further illustrated in FIG. 5C, the vertical electrodes 502.1 through 502.$k$ are placed side-by-side in a horizontal direction where each successive vertical electrode 502.1 through 502.$k$ has an increasing x coordinate in a Cartesian coordinate system to provide an example. Similarly, the horizontal electrodes 512.1 through 512.$p$ are placed one-above-the-other in a vertical direction where each successive horizontal electrode 512.1 through 512.$p$ has an increasing y coordinate in a Cartesian coordinate system to provide an example, to form the touchscreen 520. In an exemplary embodiment, the touchscreen 520 represents a projected capacitive (PCAP) touchscreen. The touchscreen 520 is substantially similar to the touchscreen 400. As such, the first electrode pattern 500 and the second electrode pattern 510 are substantially similar to the first electrode pattern 200 and the second electrode pattern 300, respectively. Therefore, only differences between these first electrode patterns and second electrode patterns are to be discussed in further detail.

To illustrate the differences between these first electrode patterns and these second electrode patterns, a region of the touchscreen 520 is illustrated in further detail in FIG. 5C, where the one or more regions 522, illustrated in "white", represent one or more optical discontinuities having no layers of transparent conductive material formed by the overlaying of the vertical electrodes 502.1 through 502.$k$ and the horizontal electrodes 512.1 through 512.$p$ as well as associated transparent conductive islands. In some situations, the one or more regions 522 are smaller than the one or more second regions 406 as discussed in FIG. 4A, which cause the one or more regions 522 to be more difficult to perceive by the human eye when viewing the touchscreen 520. Referring back to the one or more second regions 406 as illustrated in FIG. 4A, the one or more floating transparent conductive islands 518 as illustrated in FIG. 5C effectively overlap vertical sides of the one or more second regions 406. This overlapping of the vertical sides can cause the one or more regions 522 to be smaller than the one or more second regions 406. Furthermore, as transparent floating conductive island 508 has been moved to the opposite ITO layer relative to transparent floating conductive island 314 of touchscreen 400, it can be expanded vertically, reducing white area, without electrically connecting horizontal electrodes 512.1 through 512.$p$.

Third Exemplary Touchscreen

Figure 6A:
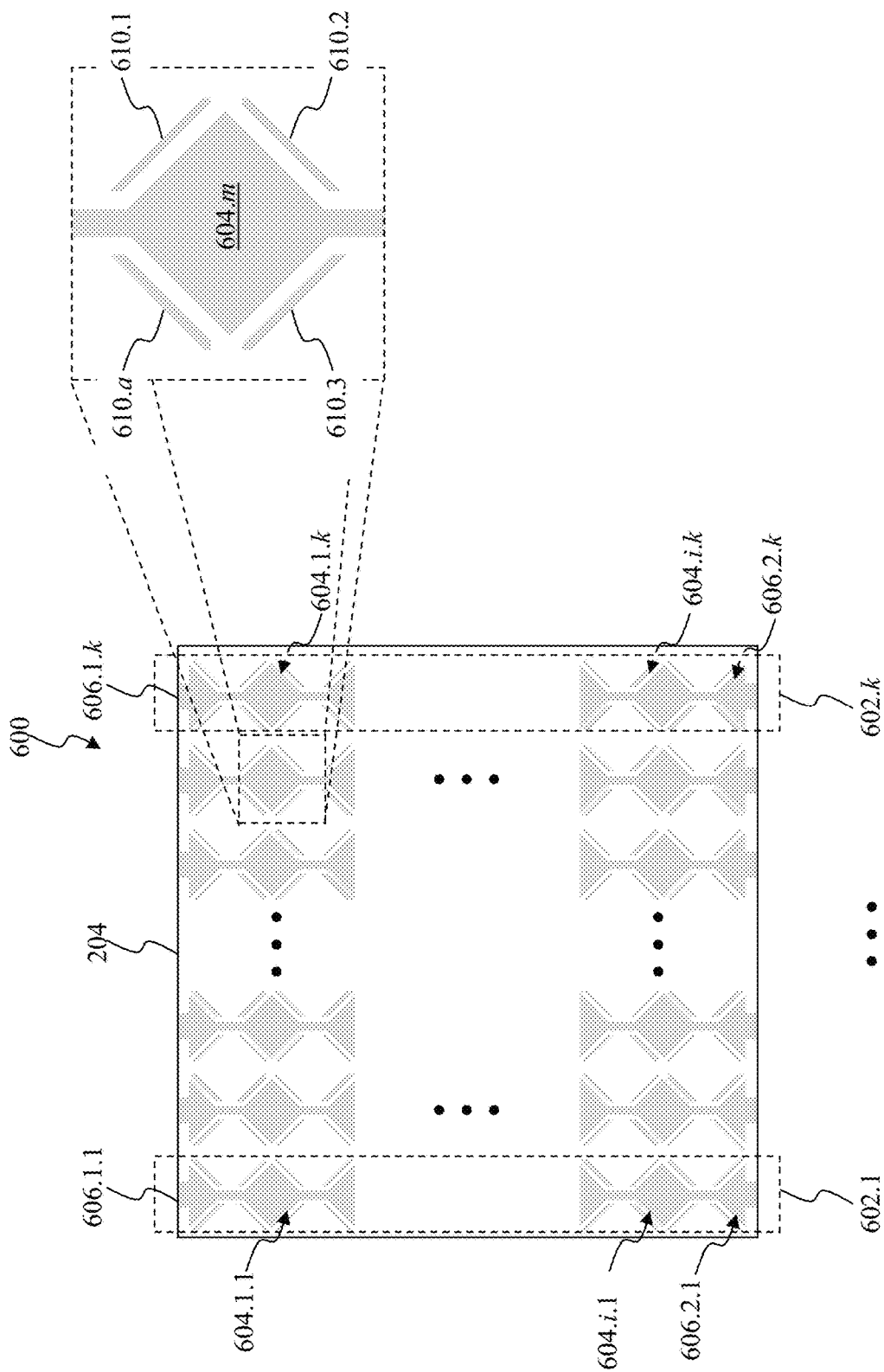
FIG. 6A through FIG. 6C illustrate a third exemplary touchscreen according to an exemplary embodiment of the present disclosure.
Figure 6B:
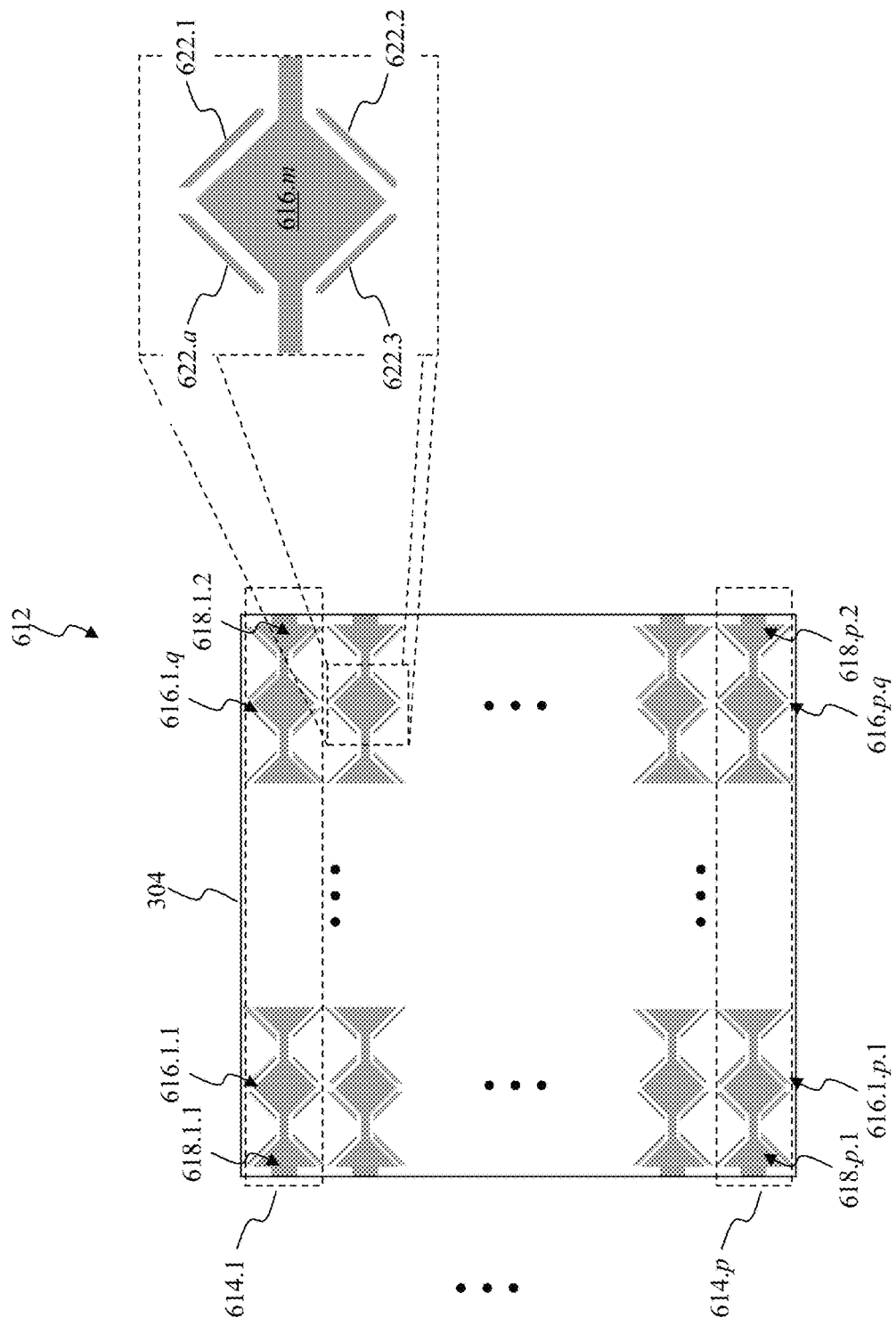
Figure 6C:
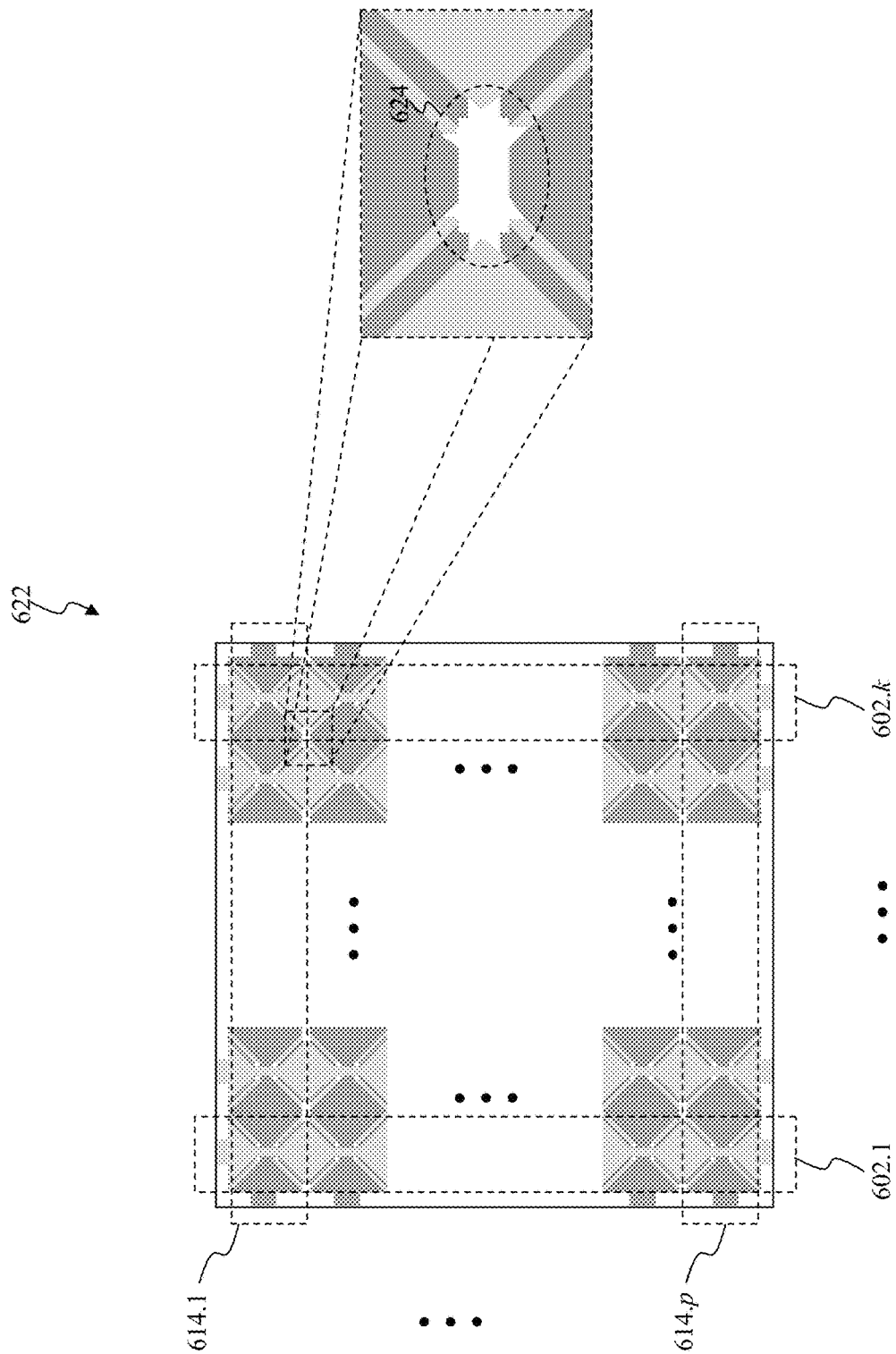

FIG. 6A through FIG. 6C illustrate a third exemplary touchscreen according to an exemplary embodiment of the present disclosure. As illustrated in FIG. 6A, a first electrode pattern 600 includes vertical electrodes 602.1 through 602.$k$ that are configured and arranged in a series of k columns on the transparent substrate 204. In the exemplary embodiment illustrated in FIG. 6A, the vertical electrodes 602.1 through 602.$k$ are oriented in a vertical direction, such as perpendicular to the x-axis of the Cartesian coordinate system. The vertical electrodes 602.1 through 602.$k$ include electrode pads 604.1.1 through 604.$i.k$ and electrode terminuses 606.1.1 through 606.2.$k$. The vertical electrodes 602.1 through 602.$k$ are substantially similar to the vertical electrodes 202.1 through 202.$k$. As such, the electrode pads 604.1.1 through 604.$i.k$ and electrode terminuses 606.1.1 through 606.2.$k$ are substantially similar to the electrode pads 206.1.1 through 206.$i.k$ and electrode terminuses 208.1.1 through 208.2.$k$, respectively. Therefore, only differences between these electrodes, electrode pads, and electrode terminuses are to be discussed in further detail. In addition, electrode pattern 600 may include a plurality of floating transparent conductive islands adjacent to each of electrode pads 604.1.1 through 604.$i.k$ and electrode terminuses 606.1.1 through 606.2.$k$.

To illustrate the differences between these electrodes, electrode pads, and electrode terminuses, an electrode pad 604.$m$ from among the electrode pads 604.1.1 through 604.$i.k$ is illustrated in further detail in FIG. 6A. As shown, electrode pad 604.$m$ has four adjacent floating transparent conductive islands 610.1 through 610.$a$, disposed in a similar fashion as floating islands 212.1 through 212.$a$ described above. By comparing the floating transparent conductive islands 212.1 through 212.$a$ and the floating transparent conductive islands 610.1 through 610.$a$, those skilled in the relevant art(s) will recognize the floating transparent conductive islands 610.1 through 610.$a$ are of sufficient length to eliminate the need for the one or more floating transparent conductive islands 314 as described with reference to FIG. 3A and FIG. 3B and/or the one or more floating transparent conductive islands 508 as described with reference to FIG. 5A and FIG. 5C. In some situations, it is desirable to fully minimize stray capacitive coupling between neighboring electrodes, such as between the vertical electrode 602.1 and the vertical electrode 602.2 and/or between the vertical electrode 602.$k$−1 and the vertical electrode 602.$k$. In this respect, the first array electrodes 600 has the disadvantage of bringing the transparent conductors 608 of neighboring electrodes into close proximity and hence increasing the capacitance between neighboring electrodes. In these situations, the first electrode pattern 200 as described in FIG. 2A and FIG. 2B is preferred.

As illustrated in FIG. 6B, a second electrode pattern 612 includes horizontal electrodes 614.1 through 614.$p$ that are configured and arranged in a series of p rows on the transparent substrate 304. In the exemplary embodiment illustrated in FIG. 6B, the horizontal electrodes 614.1 through 614.$p$ are oriented in a horizontal direction, such as perpendicular to the y-axis of the Cartesian coordinate The horizontal electrodes 614.1 through 614.$p$ include electrode pads 616.1.1 through 616.$p.q$ and electrode terminuses 618.1.1 through 618.$p$.2. The horizontal electrodes 614.1 through 614.$p$ are substantially similar to the horizontal electrodes 302.1 through 302.$p$. As such, the electrode pads 616.1.1 through 616.$p.q$ and electrode terminuses 618.1.1 through 618.$p$.2 are substantially similar to the electrode pads 306.1.1 through 306.$p.q$ and electrode terminuses 308.1.1 through 308.$p$.2, respectively. Therefore, only differences between these electrodes, electrode pads, and electrode terminuses are to be discussed in further detail. In addition, electrode pattern 612 may include a plurality of floating transparent conductive islands adjacent to each of electrode pads 616.1.1 through 616.$p.q$ and electrode terminuses 618.1.1 through 618.$p$.2.

To illustrate the differences between these electrodes, electrode pads, and electrode terminuses, an electrode pad 616.$m$ from among the electrode pads 616.1.1 through 616.$p.q$ is illustrated in further detail in FIG. 6B. As shown, electrode pad 616.$m$ has four adjacent floating transparent conductive islands 622.1 through 622.$a$, disposed in a similar fashion as floating islands 212.1 through 212.$a$ described above. By comparing the floating transparent conductive islands 312.1 through 312.$a$ and the floating transparent conductive islands 622.1 through 622.$a$, those skilled in the relevant art(s) will recognize the floating transparent conductive islands 622.1 through 622.$a$ are of sufficient length to eliminate the need for the one or more floating transparent conductive islands 314 as described with reference to FIG. 3A and FIG. 3B and/or the one or more floating transparent conductive islands 508 as described with reference to FIG. 5A and FIG. 5C. In some situations, it is desirable to fully minimize stray capacitive coupling between neighboring electrodes, such as between the horizontal electrode 614.1 and the horizontal electrode 614.2 and/or between the horizontal electrode 614.($p$−1) and the horizontal electrode 614.$p$. In this respect, the second electrode pattern 612 has the disadvantage of bringing transparent conductors 608 of neighboring electrodes into close proximity and hence increasing the capacitance between neighboring electrodes. In these situations, the second electrode pattern 300 as described in FIG. 3A and FIG. 3B is preferred.

As illustrated in FIG. 6C, the first electrode pattern 600, illustrated in "light gray," and the second electrode pattern 612, illustrated in "dark gray," are overlaid on top of each other and attached to each other with an optically clear adhesive (OCA) to form the touchscreen 622. As illustrated in FIG. 6C the vertical electrodes 602.1 through 602.$k$ are placed side-by-side in a horizontal direction where each successive vertical electrode 602.1 through 602.$k$ has an increasing x coordinate in a Cartesian coordinate system to provide an example. Similarly, the horizontal electrodes 614.1 through 614.$p$ are placed one-above-the-other in a vertical direction where each successive horizontal electrode 614.1 through 614.$p$ has an increasing y coordinate in a Cartesian coordinate system to provide an example, to form the touchscreen 622. The touchscreen 622 is substantially similar to the touchscreen 400. As such, the first electrode pattern 600 and the second electrode pattern 612 are substantially similar to the first electrode pattern 200 and the second electrode pattern 300, respectively. Therefore, only differences between these first electrode patterns and second electrode patterns are to be discussed in further detail.

To illustrate the differences between these first electrode patterns and these second electrode patterns, a region of the touchscreen 622 is illustrated in further detail in FIG. 6C. One or more regions 624, illustrated in "white" in FIG. 6C, represent one or more optical discontinuities having no layers of transparent conductive material formed by the overlaying of the vertical electrodes 602.1 through 602.$k$ and the horizontal electrodes 614.1 through 614.$p$ and associated transparent conductive floating islands. In some situations, the one or more regions 624 are smaller than the one or more second regions 406 as discussed in FIG. 4A, which cause the one or more regions 624 to be more difficult to perceive by the human eye when viewing the touchscreen 622.

Operation of the First Exemplary Touchscreen Through the Third Exemplary Touchscreen FIGS. 7A and 7B illustrate operation of the first exemplary touchscreen according to an exemplary embodiment of the present disclosure. As discussed above in FIG. 4A, the first electrode pattern 200, illustrated in "light gray," and the second electrode pattern 300, illustrated in "dark gray," are attached to form the touchscreen 400. Although only the operation of the touchscreen 400 is to be described in FIGS. 7A and 7B, those skilled in the relevant art(s) will recognize that this exemplary operation of the touchscreen 400 is likewise applicable to the touchscreen 520 and/or the touchscreen 622 without departing from the spirit and scope of the present disclosure.

The touchscreen 400 can operate in a row scanning mode of operation or in a column scanning mode of operation. In the row scanning mode of operation, one or more horizontal electrodes from among the horizontal electrodes 302.1 through 302.p are sequentially excited by a drive signal. The drive signal capacitively couples to one or more vertical electrodes from among the vertical electrodes 202.1 through 202.k. Transferred electrical charges or currents due to mutual capacitance(s) between the driven horizontal electrode and the one or more vertical electrodes are measured to detect a presence and/or a location of a touch from an operator, such as a finger of the operator, a hand of the operator, and/or other objects available to the operator, such as a stylus to provide an example. Similarly, in the column scanning mode of operation, one or more vertical electrodes from among the vertical electrodes 202.1 through 202.k are sequentially excited by a drive signal. The drive signal capacitively couples to one or more horizontal electrodes from among the horizontal electrodes 302.1 through 302.p. Transferred electrical charges or currents due to mutual capacitance(s) between the driven vertical electrode and the one or more horizontal electrodes are measured to detect a presence and/or a location of a touch from an operator. The description to follow further describes the operation of the touchscreen 400 in the row scanning mode of operation. Those skilled in the relevant art(s) will recognize that the column scanning mode of operation operates in a similar manner without departing from the spirit and scope of the present disclosure.

During the row scanning mode of operation and as further illustrated in FIGS. 7A and 7B, a horizontal electrode from among the horizontal electrodes 302.1 through 302.p is driven by an excitation signal which capacitively couples to all vertical electrodes 202.1 through 202.k. Specifically, FIG. 7A illustrates capacitive coupling of the drive signal from horizontal electrode 302.2 and vertical electrode 202.k−1 while FIG. 7B illustrates capacitive coupling of the drive signal from horizontal electrode 302.2 and vertical electrode 202.k. Generally, a mutual capacitance "$C_M$" is associated with each of the horizontal electrodes 302.1 through 302.p and a corresponding one of the vertical electrodes 202.1 through 202.k. For example, if "r" represents an index for a vertical electrode 202.r from among the vertical electrodes 202.1 through 202.k, and if "s" represents an index of a horizontal electrode 302.s from among the horizontal electrodes 302.1 through 302.p, then k.p mutual capacitances are present between the vertical electrodes 202.1 through 202.k and the horizontal electrodes 302.1 through 302.p, which can be denoted as the set of mutual capacitances $C_M(r,s)$ for r=1 to k and s=1 to p.

Associated electronics, such as the associated mechanical housing and/or electronics 106 to provide an example, electrically connected to the vertical electrodes 202.1 through 202.k measures (via received current or charge) baseline values of the mutual capacitances $C_M(r,s)$ when the touch from the operator is not present in the row scanning mode of operation. In an exemplary embodiment, these baseline values of the mutual capacitances $C_M(r,s)$ are related to a characteristic of design and/or construction of the touchscreen 400.

Ideally, the baseline values of the mutual capacitances $C_M(r,s)$ are substantially uniform throughout the touchscreen 400, such that local electrostatic field configurations associated with the capacitive coupling of the one or more measurement signals between a horizontal electrode and a vertical electrode are substantially repeatable throughout the touchscreen 400. In practice, however, differences in configuration and arrangements of the vertical electrodes 202.1 through 202.k and/or of the horizontal electrodes 302.1 through 302.p can cause the baseline values of the mutual capacitances $C_M(r,s)$ to differ. These differences in configuration and arrangement are especially prevalent around a perimeter, or edge, of the touchscreen 400, whereby interior mutual capacitances differ from edge mutual capacitances. As a result of these differences between edge mutual capacitances and the interior mutual capacitances, the baseline values of the edge mutual capacitances differ from the baseline values of the interior mutual capacitances.

Herein, mutual capacitances from among the mutual capacitances $C_M(r,s)$ may be described as being an "interior" mutual capacitance if 1<r<k and 1<s<p and/or may be described as being an "edge" mutual capacitance if r=1, r=k, s=1, or s=p. During operation of the touchscreen 400, the touch of the operator induces changes, $\Delta C_M(r,s)$, in one or more of the mutual capacitances $C_M(r,s)$ that can be measured by the associated electronics. In another exemplary embodiment, a ratio between the changes $\Delta C_M(r,s)$ in one or more of the mutual capacitances $C_M(r,s)$ and their corresponding baseline values, namely the ratio: $\Delta C_M(r,s)/C_M(r,s)$, should be large and/or the baseline values of the mutual capacitances $C_M(r,s)$ be substantially uniform.

By way of illustration, FIG. 7A considers the specific case of an interior mutual capacitance $C_M(r,s)$ where r=k−1 and s=2. This interior mutual capacitance $C_M(k−1,2)$ corresponds to vertical electrode 202.k−1 and horizontal electrode 302.2. When associated electronics drives horizontal electrode 302.2 with a voltage V, and sensing electronics has measured from vertical electrode 202.k−1 an integrated signal corresponding to a charge Q, the basic formula that defines capacitance, namely Q=CV, results in the measured value of mutual capacitance $C_M(k−1,2)$ being equal to Q/V. During this measurement process, all vertical electrodes 202.1 through 202.k and horizontal electrodes 302.1 through 302.p are grounded or virtually grounded, with the exception of the driven horizontal electrode 302.2.

Associated with this measured mutual capacitance $C_M(k−1,2)$ is a complex electrostatic field pattern. Electric field lines that connect driven horizontal electrode 302.2 to vertical electrode 202.k−1 contribute to the value of the mutual capacitance $C_M(k−1,2)$ and are represented by sixteen short solid heavy lines in FIG. 7A, where four cross from electrode pad 306.2.q−1 to electrode pad 206.1.k−1, four cross from electrode pad 306.2.q−1 to electrode pad 206.2.k−1, four cross from electrode pad 306.2.q to electrode pad 206.1.k−1, and four cross from electrode pad 306.2.q to electrode pad 206.2.k−1. Additional electric field lines, drawn as dotted lines in FIG. 7A, connect the driven horizontal electrode 302.2 with other electrodes besides vertical electrode 202.k−1. These additional electric field lines do not contribute to the value of the interior mutual capacitance $C_M(k−1,2)$. As is understood by paraphrasing rigorous electrostatics theory, the numerical value of mutual capacitance, $C_M(k−1,2)$, is proportional to a number of electric field lines connecting horizontal electrode 302.2 and vertical electrode 202.k−1, and electrostatic fields, as represented by such patterns of electric field lines, determine the values of mutual capacitances $C_M(r,s)$, such as mutual capacitance $C_M(k-1,2)$.

The complex electric field line patterns associated with interior mutual capacitances tend to be very similar, since associated local electrode geometries are very similar. Correspondingly, the values of interior mutual capacitances $C_M(r,s)$ also tend to be very similar. However, for edge mutual capacitances, differences in local electrode geometry, and hence differences in electric field line patterns, may result in significant differences in values of mutual capacitance $C_M(r,s)$. This is illustrated in FIG. 7B which considers the edge mutual $C_M C_M(k,2)$ associated with horizontal electrode 302.2 and vertical electrode 202.k.

As illustrated in FIG. 7B, there are four electric field lines between electrode pads 306.2.q and 206.1.k, because the local electrode geometry at the boundary between electrode pads 306.2.q and 206.1.k is the same as between electrode pads 306.2.q−1 and 206.1.k−1. For similar reasons, there are four electric field lines between electrode pads 306.2.q and 206.2.k. In contrast, there are not four electric field lines between electrode pad 206.1.k and electrode terminus 308.2.2 or between electrode pad 206.2.k and electrode terminus 308.2.2 in order to reflect a difference in geometry between electrode terminuses and electrode pads.

With the number of electric field lines associated with edge mutual capacitance $C_M(k,2)$ exceeding the number of electric field lines associated with interior mutual capacitance $C_M(k-1,2)$, the value of edge mutual capacitance $C_M(k,2)$ exceeds the value of interior mutual capacitance $C_M(k-1,2)$. Variations in edge mutual capacitance values may be due to a number of factors such as the geometry of electrode terminuses, as well as other objects, such as interconnect traces, affecting the local electrostatic environment.

With recognition that the greatest design-inherent variations in mutual capacitance $C_M(r,s)$ values tend to be due to edge mutual capacitances, there is a need for a design approach that can tune edge mutual capacitance values. Several such approaches are described further below with respect to FIGS. 9, 10, 11, 12, 13A and 13B. These approaches as further described below rely on having an edge pattern element as part of the electrode patterns disposed on the one or more substrates forming the touchscreen. In an embodiment, the edge pattern element may include a grounded electrode adjacent to an electrode terminus of a first electrode for adjusting an edge mutual capacitance between the first electrode and a second electrode. The grounded electrode may be grounded using capacitive coupling or using interconnect traces. In another embodiment, the grounded electrode may be configured to extend into a region occupied by a floating island while maintaining a gap with the floating island. The location of the gap may be configured according to a desired edge mutual capacitance value. Alternatively or additionally, the edge pattern element may be such that the second electrode includes a conductive extension configured to increase the edge mutual capacitance between the first electrode and the second electrode. In another embodiment, the edge pattern element may include floating islands having non-uniform widths such that the edge mutual capacitance between the first electrode and the second electrode is increased or decreased.

Using a simplified model of a three conductor system having a mutual capacitance to better describe physics concepts of these approaches, FIGS. 8A, 8B, and 8C illustrate the principal that changes in electrode geometry may change electrostatic field patterns and hence change mutual capacitance values.

Referring now to FIG. 8A, a three-conductor system 832 is shown and includes a driven electrode 822, a primary grounded electrode 824 and a secondary grounded electrode 828. Of interest is the mutual capacitance between driven electrode 822 and primary grounded electrode 824. At a basic physics level, the value of mutual capacitance $C_M$ is determined by the electrostatic field that forms around the electrodes when a voltage is applied to driven electrode 822. If driven electrode 822 is driven with a voltage V, a charge Q will flow away from primary grounded electrode 824 leaving the opposite change −Q on primary grounded electrode 824. The charge Q may be measured by current or charge sensing electronics electrically connected to primary grounded electrode 824 resulting in a measured mutual capacitance $C_M=Q/V$. For a given electrode geometry, $C_M$ may be numerically determined by using Laplace's Equations to solve for the electrostatic field configuration, as is well appreciated by those of skill in the art. The value of Q, and hence the value of mutual capacitance $C_M$, is proportional to the number of electric field lines connecting the driven electrode 822 to the primary grounded electrode 824. With acknowledgment to the $19^{th}$ century discovery of Michael Faraday regarding the concept that electric field lines provide an excellent intuitive basis for visually considering electrostatic fields, electric field lines are schematically drawn in FIG. 8A to represent the electrostatic field in the region 830.

Referring now to FIG. 8B, an electrostatic field in region 840 is changed relative to the electrostatic field in region 830 of three-conductor system 832. The change reflects a shift in an upward direction 834 of secondary grounded electrode 848, as compared to the secondary grounded electrode 828 of three-conductor system 832. As a result, the value of mutual capacitance is larger for the three-conductor system 842 than for three-conductor system 832, as is implied by an increased number of electric field lines between electrodes 822 and 824.

Correspondingly, FIG. 8C illustrates a three-conductor system 852 in which the secondary grounded electrode 858 is moved in a downward direction 836, thus altering the electrostatic fields in region 850 in a way that reduces the mutual capacitance between electrodes 822 and 824.

As may not be readily recognized for a touchscreen 400 with its large number of (k+p) electrodes, when considering the measurement of one individual mutual capacitance value, such as the measurement of mutual capacitance $C_M(k,2)$ highlighted in FIG. 7B, touchscreen 400 approximates a three conductor system as described with the conceptual models of FIGS. 8A, 8B and 8C. For example, horizontal electrode 302.2 of touchscreen 400 is analogous to driven electrode 822 and vertical electrode 202.k is analogous to primary grounded electrode 824. Because the remaining (k+p−2) electrodes of touchscreen 400 are all grounded or virtually grounded during the measurement of $C_M(k,2)$, this entire set of (k+p−2) electrodes of touchscreen 400, as well as any associated interconnect and shield traces, may all be considered to be represented by the secondary grounded electrode 828, 848 or 858 of three-conductor system 832, 842, or 852. Readers with a deep knowledge of electrostatics will recognize that for conceptual clarity, if not numerical accuracy, the electric field lines drawn in a very stylized and schematic way in the figures. Nevertheless, the conclusions drawn from the stylized electric field lines are true to the underlying physics of electrostatics.

Fourth Exemplary Touchscreen

FIG. 9 illustrates in part a touchscreen 900 that has many elements in common with touchscreen 400 illustrated in FIGS. 2, 3, 4, 7A and 7B above. Specifically, touchscreen 900 includes vertical electrodes 202.1 through 202.$k$ on substrate 204 and horizontal electrodes 302.1 through 302.$p$ on substrate 304. Touchscreen 900 also includes interconnect traces 910 which make electrical connections between electrodes and associated electrodes, and are explicitly shown in FIG. 9 for horizontal electrodes 302.1 and 302.2. It is noted that touchscreen 400 also includes interconnect traces such as interconnect traces 910, even if not explicitly shown in FIG. 4A for ease of presentation. For the purposes of reducing values of edge mutual capacitance $C_M(k,2)$, touchscreen 900 also includes grounded electrodes 920.1 and 920.2 on the surface of substrate 204. Interconnect traces 910 shown in FIG. 9 are on the surface of the other substrate (substrate 304), which is below substrate 204, and so electrodes 920.1 and 920.2 pass over interconnect traces 910 with no mechanical interference. Additional interconnect traces (not shown) on the surface of substrate 204 ground the grounded electrodes 920.1 and 920.2. Some electric field lines that otherwise would have gone between terminus 308.2.2 and vertical electrode 202.$k$ now go between terminus 308.2.2 and grounded electrodes 920.1 and 920.2, thus reducing the value of $C_M(k,2)$. In this manner the additional grounded electrodes enable adjustment of edge mutual capacitance values.

The amount of reduction of edge mutual capacitance $C_M(k,2)$ is determined by how closely grounded electrodes 920.1 and 920.2 encroach vertical electrode 202.$k$. The corresponding gap distances provide a design approach to tune the value of $C_M(k,2)$. Similarly grounded electrodes 920.3 through 920.$p$ (not shown) provide an approach to tune the values of remaining right side edge mutual capacitances $C_M(k,s)$ for s=3 top. Additional grounded electrodes 930 are optionally added at the corners to provide more ability to tune the corner mutual capacitances $C_M(k,1)$ and $C_M(k,p)$. With up to p+2 added grounded electrodes and associated adjustable gaps, there are sufficient design degrees of freedom to individually tune all edge mutual capacitance values $C_M(k,s)$ along the right edge of touchscreen 900. Similar design principles may be applied to adjust edge mutual capacitances on the other sides of touchscreen 900.

While touchscreen 900 includes floating islands 212 and 312, it will be apparent to those skilled in the art that the presented approaches for tuning edge mutual capacitances using additional grounded electrodes are equally applicable in touchscreen designs without floating islands 212 and 312.

Fifth Exemplary Touchscreen

Touchscreen 1000 shown in part in FIG. 10 illustrates another approach to adjust edge mutual capacitance values. Floating islands 1020 and 1030 proximate to horizontal electrode terminuses 1008.1.2 through 1008.$p$.2 are similar to floating islands 212 and floating islands 312 respectively, except for a difference in floating island width. The widths of floating islands 1020 and 1030 of touchscreen 1000 may be either greater than or less than the widths of floating islands 212 and 312 located elsewhere in touchscreen 1000. Due to differences in adjacent floating island widths, the geometry of the right-most vertical electrode 1002.$k$ may differ in detail from the geometry of vertical electrode 202.$k$ of touchscreen 400. As drawn, FIG. 10 illustrates the case where floating islands 1020 and 1030 are wider than floating islands 212 and 312, and hence a greater distance of separation between horizontal electrode terminus 1008.2.2 and proximate edges of vertical electrode 1002.$k$. This greater distance weakens the corresponding electric field strength. In FIG. 10, this is represented by fewer electric field lines being drawn between horizontal electrode terminus 1008.2.2 and vertical electrode 1002.$k$ than are drawn between horizontal electrode terminus 308.2.2 and vertical electrode 202.$k$ in FIG. 7B.

Increasing the widths of floating islands 1020 and 1030 reduces the value of edge mutual capacitance $C_M(k,2)$. In contrast, decreasing the widths of floating islands 1020 and 1030 increases the value of edge mutual capacitance $C_M(k,2)$. Hence, to the extent that the manufacturing process supports narrower floating island widths, the edge mutual capacitance tuning method illustrated in FIG. 10 enables tuning of edge mutual capacitance values in either direction. Furthermore, not all floating islands 1020 and 1030 need have the same width, thus providing an approach to individually tune different edge mutual capacitances.

In alternate embodiments, floating islands 212, 312, 1020 and 1030 may be removed while retaining the same gaps between vertical and horizontal electrodes. In such embodiments the same edge capacitance tuning method applies with only a shift in attention from island widths to widths of unfilled gaps between electrodes.

Sixth Exemplary Touchscreen

For cases where it is desirable to increase (not reduce) edge mutual capacitance values, the example of touchscreen 1100 illustrated in part in FIG. 11 is provided. As illustrated in FIG. 11, vertical electrode 1102.$k$ differs from the design of vertical electrode 202.$k$ of touchscreen 400, such that conductive extensions 1110 are added to the right sides of electrode pads 1106.1.$k$ through 1106.$i$.$k$ (1106.1.$k$ and 1106.2.$k$ explicitly shown in FIG. 11) of vertical electrode 1102.$k$. Electric field lines between horizontal electrode terminus 308.2.2 and extensions 1110 of vertical electrode 1102.$k$ increase the value of mutual capacitance $C_M(k,2)$. As the size of the extension increases, there is a corresponding increase in mutual capacitance, so the size of each extension 1110 provides a way to tune mutual capacitance values individually. Optionally, the terminuses of vertical electrode 1102.$k$ may include extensions 1120 in order to further enable tuning of corner mutual capacitance values $C_M(k,1)$ and $C_M(k,p)$. Following the same principles illustrated in FIG. 11, edge mutual capacitances can be adjusted on any side of touchscreen 1100.

While touchscreen 1100 includes floating islands 212 and 312, it will be apparent to those skilled in the art that the presented method for tuning edge mutual capacitances using electrode pad extensions is equally applicable in touchscreen designs without floating islands 212 and 312.

Seventh Exemplary Touchscreen

Touchscreen 1200 shown in part in FIG. 12 illustrates yet another approach to edge mutual capacitance tuning based on modifying geometry of electrode terminuses. For example, the geometry of electrode terminus 1208.2.2 differs from that of electrode terminus 308.2.2 of touchscreen 400. For ease of comparison, dotted outline 1210 shows the geometry of unmodified electrode terminus 308.2.2. Because of the reduced area of electrode terminus 1208.2.2, the terminus has reduced perimeter length proximate to electrode 202.$k$, and hence fewer electric field lines between electrode terminus 1208.2 and vertical electrode 202.$k$. The result is a reduced value of mutual capacitance $C_M(k,2)$. The shapes of different terminuses may be modified by different amounts. With such modifications to the shapes of electrode terminuses 1208.1.2 through 1208.$p$.2, each of the individual values of edge mutual capacitances $C_M(k,s)$ for s=1 to p can be independently tuned. Edge mutual capacitances on other sides of touchscreen 1200 may be similarly selectively tuned.

While touchscreen 1200 includes floating islands 212 and 312, it will be apparent to those skilled in the art that the presented method for tuning of edge mutual capacitances using electrode pad extensions is equally applicable in touchscreen designs without floating islands 212 and 312.

Eighth Exemplary Touchscreen

Touchscreen 1300 shown in part in FIG. 13A illustrates another particularly advantageous approach for tuning edge mutual capacitances. Just as touchscreen 900 includes grounded electrodes 920, touchscreen 1300 includes grounded electrodes 1320. Grounded electrodes 1320 are grounded via grounded interconnect traces (not shown). However, unlike grounded electrodes 920, grounded electrodes 1320 extend partially or fully into regions that in touchscreens 400 and 900 are occupied by floating islands 212.1 and 212.2. If the extensions of grounded electrodes 1320 do not fully extend into the regions corresponding to the floating islands 212, the shortened floating islands 1322, and a gap, fill the remaining region of floating islands 212. The amount of reduction of the value of the edge mutual capacitances depends on the location of the gap between grounded electrodes 1320 and floating islands 1322. The further to the left direction that these gaps are moved, the more that the right edge mutual capacitances are reduced. Furthermore, the amount of reduction will be an approximately linear function of the distance these gaps are moved, thus simplifying the tuning processes. Particular advantages result, as described for the design of touchscreen 1300.

When, as with the grounded electrodes 920 of touchscreen 900, the grounded electrodes 1320 of touchscreen 1300 are on a different glass surface than interconnect traces 910, mechanical interference between grounded electrodes 1320 and interconnection traces 910 are avoided. However, as presented with reference to FIG. 13B, it is not a requirement that grounded electrodes be on a different glass surface than the interconnect traces.

Touchscreen 1302 of FIG. 13B has grounded electrodes 1330 and floating islands 1332 that are analogous to grounded electrodes 1320 and floating islands 1322 of touchscreen 1300 of FIG. 13A. Again right edge mutual capacitances vary approximately linearly with the location of the gap between grounded electrodes 1330 and floating islands 1332. However, unlike for touchscreen 1300, grounded electrodes 1330 and floating islands are on the same surface of substrate 304 as the horizontal electrodes 302 and interconnect traces 910. While seemingly impossible to make the electrical connections necessary to ground the electrodes 1330 on the surface of substrate 304, as there is no way to make a direct-current (DC) electrical connection to the electrodes 1330 without interfering with interconnection traces 910, an important insight is that a direct-current electrical connection is not required and instead capacitive coupling may be used.

As shown, touchscreen 1302 includes other grounded electrodes 1334. In the plan view of FIG. 13B, grounded electrode 1330 and grounded electrode 1334 overlap within an overlap area 1336. With A being the area of overlap area 1336, and symbols d and ε used to represent the thickness and dielectric constant of the optically clear adhesive 408 (see FIG. 4B), respectively, then the parallel-plate-capacitor formula, $C=\varepsilon A/d$, predicts a capacitive coupling between grounded electrode 1330 and grounded electrode 1334. For example, if A=6 mm$^2$, d=200 μm, and ε=4×8.85 pF/m (picoFarad per meter), then C≈1 pF. As long as the capacitance between electrodes 1330 and other conductors (not including the grounded electrode 1334) is comparable or less than this value, then electrodes 1330 will effectively be grounded and serve the intended purpose. To compensate for the effects of a lack of a true DC ground connection, it may be necessary to move the gaps between grounded electrode 1330 and floating islands 1332 further to the left direction than would otherwise be necessary, and is readily achievable while room exists to move the gaps to the left.

As described with reference to FIG. 13A and FIG. 13B, adjustments to edge mutual capacitances on the right side of the touchscreen result. Of course, the illustrated design approaches may be applied to left, top and bottom sides of the touchscreen as well. Furthermore, both approaches may be used in the same touchscreen. For example, if it is deemed desirable to place all grounded electrodes on the lower substrate 304, then the design approach of FIG. 13A may be used on the top and bottom sides while the design approach of FIG. 13B may be used on the left and right sides of the touchscreen. This is of interest because, for cosmetic reasons, the design and manufacture of the user-facing top substrate 204 is more constrained than for the bottom substrate 304, as is well appreciated by those skilled in the art.

Of note, the designs of FIGS. 13A and 13B make use of floating islands 212 and 312, and modifications thereof to simultaneously provide for touchscreens with electrode patterns of low visibility, having adjusted edge mutual capacitance values, while being compatible with screen printing manufacturing processes.

Of further note, the ability to tune edge mutual capacitance to ensure that none of the values of edge mutual capacitances significantly exceed the values of interior mutual capacitances avoids loss of effective analog-to-digital-convertor (ADC) resolution when measuring $C_M(r,s)$. Often, in the measurement of all mutual capacitance values $C_M(r,s)$, the same electronics gain is used. With the understanding that touches reduce, rather than increase, measured mutual capacitance values, and thus, touch induced changes to mutual capacitance values have such little effect on gain settings, prevention of ADC full-scale saturation for any of the mutual capacitance measurements focuses on electronics gain being determined by the maximum mutual capacitance $C_M(r,s)$ value. With substantially minimized variation, effective ADC resolution for mutual capacitance measurements can be achieved.

Of additional note, the ability to tune edge mutual capacitance has further potential positive impact. On a touchscreen production line, the measured variance of $C_M(r,s)$ values provides a convenient quality test. However, any such measured mutual-capacitance variance includes not only possible effects of manufacturing variations, but also mutual-capacitance variations inherent in the product design. As can be well appreciated, improvements to minimize variations in the product design allow production line quality testing based on measured variance of $C_M(r,s)$ values to be more sensitive to the production floor quality itself.

Exemplary Fabrication Techniques That Can Be Used to Fabricate the Exemplary Touchscreens According to an Exemplary Embodiment of the Present Disclosure FIG. 14 is a flowchart of a first exemplary fabrication control flow that can be used to fabricate the touchscreens according to an exemplary embodiment of the present disclosure. The disclosure is not limited to this exemplary fabrication control flow. Rather, it will be apparent to persons skilled in the relevant art(s) that other fabrication control flows are within the scope and spirit of the present disclosure. The following discussion describes a fabrication control flow 1400 of a touchscreen, such as the touchscreen 102, the touchscreen 400, the touchscreen 520, the touchscreen 622, the touchscreen 900, the touchscreen 1000, the touchscreen 1110, the touchscreen 1210, the touchscreen 1300 and/or the touchscreen 1302 to provide some examples, and represents a single transparent conductive material design, such as the SITO design as described in FIG. 1, having two transparent substrates, each of the transparent substrates having a corresponding electrode pattern.

At step 1402, deposition of transparent conductive material onto a first transparent substrate occurs, such as the transparent substrate 204. In an exemplary embodiment, the transparent substrate is implemented using a plate of glass and the transparent conductive material is indium tin oxide (ITO).

At step 1404, selective patterning of the first transparent substrate occurs to form a first electrode pattern, such as the first electrode pattern 200, the first electrode pattern 500, and/or the first electrode pattern 600. In an exemplary embodiment, a screen printing process is used to deposit an etchant material onto the first transparent substrate of step 1402 using a mask, the mask having the negative of a pattern of the first electrode pattern, and an etching process, such as a wet or dry etch, patterns the first transparent substrate of step 1402 to form the first electrode pattern. The etching process removes any conductive material from the first transparent substrate of step 1402 that is not covered by the mask while leaving any conductive material from the first transparent substrate of step 1402 that is covered by the mask.

At step 1406 deposition of transparent conductive material onto a second transparent substrate, such as the transparent substrate 304, occurs. The transparent conductive material options for step 1406 are the same as for step 1402.

At step 1408, selective patterning of the second transparent substrate of step 1406 occurs to form a second electrode pattern, such as the second electrode pattern 300, the second electrode pattern 510, and/or the second electrode pattern 612. In an exemplary embodiment, the fabrication control flow 1400 uses a screen printing process similar to that in step 1404.

At step 1410, the first pattern transparent substrate of step 1404 and the second pattern transparent substrate of step 1408 are attached to each other with an optically clear adhesive (OCA) to form the touchscreen. The OCA can be an acrylic-based adhesive, a silicone-based adhesive, polyvinyl butyral (PVB), ethylene-vinyl acetate (EVA), or any other suitable OCA that will be recognized by those skilled in the relevant art(s) without departing from the spirit and scope of the present disclosure.

FIG. 15 is a flowchart of a second exemplary fabrication control flow that can be used to fabricate the touchscreens according to an exemplary embodiment of the present disclosure. The disclosure is not limited to this exemplary fabrication control flow. Rather, it will be apparent to persons skilled in the relevant art(s) that other a fabrication control flows are within the scope and spirit of the present disclosure. The following discussion describes a fabrication control flow 1500 of a touchscreen, such as the touchscreen 102, the touchscreen 400, the touchscreen 520, the touchscreen 622, the touchscreen 900, the touchscreen 1000, the touchscreen 1110, the touchscreen 1210, the touchscreen 1300 and/or the touchscreen 1302. The fabrication control flow 1500 of FIG. 15 represents a double transparent conductive material design, such as the DITO design as described in FIG. 1, having one transparent substrate with two electrode patterns.

At step 1502, transparent conductive material deposition onto a first side and a second side of a first transparent substrate, such as transparent substrate 304 for example, occurs. In an exemplary embodiment, the transparent substrate is implemented using a plate of glass.

At step 1504, selectively patterning the first side of the first transparent substrate of step 1502 occurs to form a first electrode pattern, such as the first electrode pattern 200, the first electrode pattern 500, and/or the first electrode pattern 600. In an exemplary embodiment, a screen printing process is used to deposit an etchant, having a negative of the pattern of the first electrode pattern, onto the first transparent substrate of step 1502, and an etching process, such as a wet or dry etch, is used on the first side of the first transparent substrate of step 1502 to form the first electrode pattern. The etching process removes any conductive material from the first side of the first transparent substrate of step 1502 that is not covered by the mask while leaving any conductive material from the first side of the first transparent substrate of step 1502 that is covered by the mask.

At step 1506, selectively patterning of the second side of the first transparent substrate of step 1502 occurs to form a second electrode pattern, such as the second electrode pattern 300, the second electrode pattern 510, and/or the second electrode pattern 612. In an exemplary embodiment, a screen printing process is used to deposit an etchant, having a negative of the pattern of the second electrode pattern, onto the second transparent substrate of step 1504, an etching process, such as a wet or dry etch, is used to pattern the second side of the first transparent substrate of step 1502 to form the second electrode pattern. The etching process removes any conductive material from the second side of the first transparent substrate of step 1502 that is not covered by the mask while leaving any conductive material from the second side of the first transparent substrate of step 1502 that is covered by the mask.

At step 1506, the first pattern transparent substrate of step 1504 and a second pattern transparent substrate are attached to each other with an optically clear adhesive (OCA) to form the touchscreen.

CONCLUSION

The Detailed Description referred to accompanying figures to illustrate exemplary embodiments consistent with the disclosure. References in the disclosure to "an exemplary embodiment" indicates that the exemplary embodiment described include a particular feature, structure, or characteristic, but every exemplary embodiment can not necessarily include the particular feature, structure, or characteristic. Moreover, such phrases are not necessarily referring to the same exemplary embodiment. Further, any feature, structure, or characteristic described in connection with an exemplary embodiment can be included, independently or in any combination, with features, structures, or characteristics of other exemplary embodiments whether or not explicitly described.

The exemplary embodiments described within the disclosure have been provided for illustrative purposes, and are not intend to be limiting. Other exemplary embodiments are possible, and modifications can be made to the exemplary embodiments while remaining within the spirit and scope of the disclosure. The disclosure has been described with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The Detailed Description of the exemplary embodiments fully revealed the general nature of the disclosure that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based on the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

The terminology used herein is for the purpose of describing particular embodiments only and is not intended to be limiting. For example, as used herein, the singular forms "a," "an" and "the" are intended to include the plural forms as well, unless the context clearly indicates otherwise. It will be further understood that the terms "comprises," "comprising," "includes" and "including," when used herein, specify the presence of stated features, steps, operations, elements, and components, but do not preclude the presence or addition of one or more other features, steps, operations, elements, components, or groups thereof.

What is claimed is:

1. A touchscreen, comprising:
   a transparent substrate; and
   electrode patterns disposed on the transparent substrate, the electrode patterns including a first electrode including a first electrode terminus,
   a second electrode having a first edge adjacent to at least the first electrode terminus of the first electrode, wherein the first edge of the second electrode includes a first conductive extension configured to adjust a first edge mutual capacitance between the first electrode terminus and the second electrode,
   wherein an increase in a size of the first conductive extension, results in a corresponding increase in the first edge mutual capacitance.

2. The touchscreen of claim 1, wherein a second edge of the second electrode includes a second conductive extension configured to adjust a second edge mutual capacitance between the first electrode and the second electrode, wherein the size of the first conductive extension and a size of the second conductive extension are different.

3. The touchscreen of claim 1, wherein a second edge of the second electrode includes a second conductive extension configured to adjust a second edge mutual capacitance between the first electrode and the second electrode, wherein a length of the first conductive extension and a length of the second conductive extension are different.

4. The touchscreen of claim 1, further comprising: a third electrode with a third electrode terminus, wherein the second electrode comprises a second electrode terminus, wherein the second electrode terminus is adjacent to the third electrode terminus, and wherein the second electrode terminus comprises a second conductive extension configured to adjust a first corner mutual capacitance between the second electrode terminus and the third electrode terminus.

5. The touchscreen of claim 4, further comprising: a fourth electrode with a fourth electrode terminus, wherein the second electrode comprises a fifth electrode terminus on an opposite edge of the touchscreen than the second electrode terminus, wherein the fifth electrode terminus is adjacent to the fourth electrode terminus, and wherein the fifth electrode terminus comprises a third conductive extension configured to adjust a second corner mutual capacitance between the fifth electrode terminus and the fourth electrode terminus.

6. The touchscreen of claim 5, wherein the second and the third conductive extensions are different lengths.

7. The touchscreen of claim 5, wherein the second and the third conductive extensions are different sizes.

8. The touchscreen of claim 1, wherein the first electrode further comprises an electrode pad adjacent to the first electrode terminus, the touchscreen further comprises:
   a first floating island located between the second electrode and the first electrode terminus; and
   a second floating island located between the second electrode and the electrode pad.

9. The touchscreen of claim 8, wherein the first floating island has a greater width than the second floating island.

10. The touchscreen of claim 8, wherein a width of the first floating island is configured to reduce the first edge mutual capacitance between the first electrode and the second electrode.

11. A touchscreen, comprising:
    a transparent substrate; and
    electrode patterns disposed on the transparent substrate, the electrode patterns including a first electrode including a first electrode terminus,
    a second electrode adjacent to at least the electrode terminus of the first electrode,
    wherein the first electrode terminus includes a first geometric area configured to adjust a first edge mutual capacitance between the first electrode and the second electrode,
    wherein a reduction of the first geometric area results in a corresponding reduction in the edge mutual capacitance.

12. The touchscreen of claim 11, wherein the reduction of the first geometric area comprises a reduction of a perimeter length proximate to the second electrode.

13. The touchscreen of claim 11, further comprising:
    a third electrode including a third electrode terminus with a second geometric area configured to adjust a second edge mutual capacitance between the third electrode and the second electrode independent of the first edge mutual capacitance.

14. The touchscreen of claim 13, wherein the second geometric area comprises a different perimeter length proximate to the second electrode than the first geometric area.

15. The touchscreen of claim 13, wherein the second geometric area comprises a different geometric shape than the first geometric area.

16. The touchscreen of claim 11, wherein the first electrode comprises a second electrode terminus on another side of the touchscreen with a second geometric area, wherein the second electrode terminus is adjacent to a third electrode, wherein a reduction of the second geometric area results in a corresponding reduction in a second edge mutual capacitance between the first electrode and the third electrode.

17. The touchscreen of claim 16, wherein the second geometric area comprises a different perimeter length proximate to the third electrode than a perimeter length between the first geometric area and the second electrode.

18. The touchscreen of claim 16, wherein the second geometric area comprises a different geometric shape than the first geometric area.

19. A touchscreen, comprising:
a transparent substrate; and
electrode patterns disposed on the transparent substrate, the electrode patterns including a first electrode including a first electrode terminus,
a second electrode adjacent to at least the electrode terminus of the first electrode,
wherein the first electrode terminus includes a first geometric area configured to adjust an edge mutual capacitance between the first electrode and the second electrode,
wherein a reduction of the first geometric area results in a corresponding reduction in the edge mutual capacitance.

20. The touchscreen of claim 19, wherein the electrode patterns are disposed on the transparent substrate using a fabrication process having an etch resolution.

* * * * *